(12) United States Patent
Saito et al.

(10) Patent No.: US 11,987,190 B2
(45) Date of Patent: May 21, 2024

(54) WIRE HARNESS

(71) Applicant: SUMITOMO WIRING SYSTEMS, LTD., Yokkaichi (JP)

(72) Inventors: Ryuta Saito, Yokkaichi (JP); Katsutoshi Izawa, Yokkaichi (JP); Kosuke Tanaka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/990,278

(22) Filed: Nov. 18, 2022

(65) Prior Publication Data
US 2023/0166675 A1    Jun. 1, 2023

(30) Foreign Application Priority Data

Nov. 26, 2021  (JP) ................................. 2021-192257
Jan. 13, 2022  (JP) ................................. 2022-003732

(51) Int. Cl.
*B60R 16/02* (2006.01)
*H02G 3/04* (2006.01)
*H02G 3/32* (2006.01)

(52) U.S. Cl.
CPC ....... *B60R 16/0215* (2013.01); *H02G 3/0468* (2013.01); *H02G 3/32* (2013.01)

(58) Field of Classification Search
CPC .. H02G 3/40; H02G 3/30; H02G 3/32; H02G 3/0418; H02G 3/04; B60R 16/0207; B60R 16/0215; H01B 7/0045; F16L 3/1075; F16L 3/1083

See application file for complete search history.

(56) References Cited

U.S. PATENT DOCUMENTS

| | | | | |
|---|---|---|---|---|
| 2,408,253 A * | 9/1946 | Diebold | ................... | H02G 7/00 174/136 |
| 3,069,189 A * | 12/1962 | Hollaender | ............... | E04G 7/14 403/385 |
| 3,526,934 A * | 9/1970 | Owen, Sr. | ............. | F16B 7/0433 248/68.1 |
| 5,476,462 A * | 12/1995 | Allard | ................ | A61B 17/7032 606/279 |
| 6,110,172 A * | 8/2000 | Jackson | ............ | A61B 17/7032 606/305 |
| 7,278,190 B2 * | 10/2007 | Fischer | ................... | F16L 3/223 248/74.2 |
| 7,740,211 B2 * | 6/2010 | Dukes | ...................... | H02G 1/08 248/74.1 |
| 8,505,858 B2 * | 8/2013 | Hansen | ................. | F16L 3/1226 174/664 |

(Continued)

FOREIGN PATENT DOCUMENTS

JP      2009038899 A *  2/2009  ............... H02G 3/30

*Primary Examiner* — Paresh Paghadal
(74) *Attorney, Agent, or Firm* — Oliff PLC

(57) ABSTRACT

A wire harness including: a wire harness main body that includes an electric wire and an exterior tube that covers an outer circumferential surface of the electric wire; a first path restrictor that is attached to an outer circumferential surface of the exterior tube and is configured to restrict a path of the wire harness main body; and an attachment that is attached to an outer circumferential surface of a portion of the first path restrictor in a lengthwise direction thereof.

8 Claims, 16 Drawing Sheets

(56) References Cited

U.S. PATENT DOCUMENTS

| | | | |
|---|---|---|---|
| 8,702,044 B2* | 4/2014 | Railsback | F16L 3/237 |
| | | | 248/65 |
| 8,807,491 B2* | 8/2014 | Armit | F16L 3/222 |
| | | | 248/68.1 |
| 11,143,239 B2* | 10/2021 | Wesstrom | F16C 29/02 |
| 2002/0179780 A1* | 12/2002 | Benoit | F16B 21/084 |
| | | | 248/74.1 |
| 2009/0224111 A1* | 9/2009 | Gilbreath | F16L 3/222 |
| | | | 248/68.1 |
| 2019/0089142 A1 | 3/2019 | Sugino | |
| 2020/0274343 A1 | 8/2020 | Sugino | |

* cited by examiner

WIRE HARNESS

BACKGROUND

The present disclosure relates to a wire harness.

Conventionally, as a wire harness for a vehicle, there has been a wire harness that includes: a wire harness main body that includes an electric wire member and an exterior member that covers the electric wire member; and a path restricting member that is attached to an outer circumferential surface of the exterior member and is configured to restrict the path of the wire harness main body (for example, see JP 2019-53894A).

SUMMARY

In the above-described wire harness, the path restricting member may be attached to an attaching member such as another path restricting member, and in such a case, it is desirable that an attaching portion between the path restricting member and the attaching member does not rattle. Note that rattling of the attaching portion may cause damage to the attaching portion due to vibration, for example.

An exemplary aspect of the disclosure provides a wire harness that is capable of suppressing rattling.

A wire harness according to the present disclosure includes: a wire harness main body that includes an electric wire and an exterior tube that covers an outer circumferential surface of the electric wire; a first path restrictor that is attached to an outer circumferential surface of the exterior tube and is configured to restrict a path of the wire harness main body; and an attachment that is attached to an outer circumferential surface of a portion of the first path restrictor in a lengthwise direction thereof, wherein: the first path restrictor is provided with an insertion port that is open in a direction orthogonal to the lengthwise direction of the first path restrictor, and extends over an entirety of the first path restrictor in the lengthwise direction thereof, the attachment is provided with a receiver that covers a portion of the first path restrictor in a circumferential direction thereof, and a lid that covers all the way around the first path restrictor together with the receiver, the receiver is provided with a rail that extends in a lengthwise direction of the receiver, the lid is provided with a slide that is configured to be slidable along the rail while engaging with the rail so that the lid does not become detached from the receiver, and the receiver and the lid sandwich the first path restrictor with the slide engaging with the rail.

The wire harness according to the present disclosure is capable of suppressing rattling.

DETAILED DESCRIPTION OF EMBODIMENTS

Figure 1:
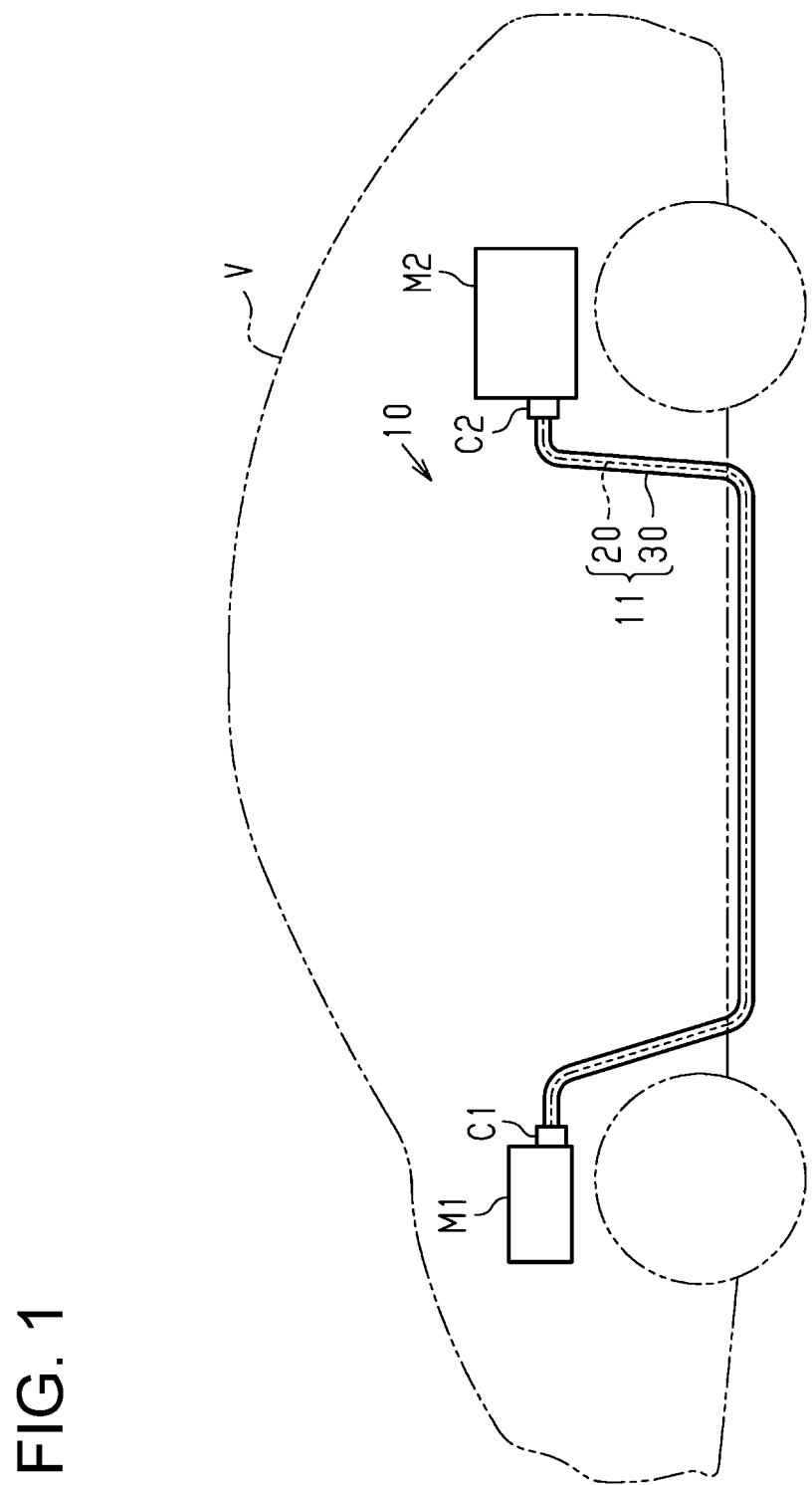
FIG. 1 is a schematic configuration diagram showing a wire harness according to an embodiment.

First, embodiments of the present disclosure will be listed and described.

A wire harness according to the present disclosure is

[1] a wire harness including: a wire harness main body that includes an electric wire member and an exterior member that covers an outer circumferential surface of the electric wire member; a first path restricting member that is attached to an outer circumferential surface of the exterior member and is configured to restrict a path of the wire harness main body; and an attaching member that is attached to an outer circumferential surface of a portion of the first path restricting member in a lengthwise direction thereof. The first path restricting member is provided with an insertion port that is open in a direction orthogonal to the lengthwise direction of the first path restricting member, and extends over an entirety of the first path restricting member in the lengthwise direction thereof, the attaching member is provided with a receiving portion that covers a portion of the first path restricting member in a circumferential direction thereof, and a lid that covers all the way around the first path restricting member together with the receiving portion, the receiving portion is provided with a rail portion that extends in a lengthwise direction of the receiving portion, the lid is provided with a slidable portion that is configured to be slidable along the rail portion while engaging with the rail portion so that the lid does not become detached from the receiving portion, and the receiving portion and the lid sandwich the first path restricting member with the slidable portion engaging with the rail portion.

With this configuration, the receiving portion is provided with a rail portion that extends in the lengthwise direction of the receiving portion, and the lid is provided with a slidable portion that is configured to be slidable along the rail portion while engaging with the rail portion so that the lid does not become detached from the receiving portion. Therefore, it is possible to prevent the receiving portion and the lid from becoming detached from each other. That is to say, when the lid is attached to the receiving portion as a result of the slidable portion sliding while engaging with the rail portion, the rail portion and the slidable portion prevent the receiving portion the lid from becoming detached from each other in a radial direction of the first path restricting member. As a result, for example, rattling of the receiving portion and the lid is suppressed compared to a configuration in which a lid is formed integrally with a receiving portion with a thin hinge portion being interposed therebetween, and the lid is locked to the receiving portion as a result of claw portions engaging with each other in a closed state. That is to say, in a configuration with a thin hinge portion and claw portions, rattling is likely to occur between the receiving portion and the lid at the thin hinge portion and the claw portions. However, it is possible to prevent such rattling from occurring. Therefore, it is possible to sandwich the first path restricting member between the receiving portion and the lid so as not cause rattling, and it is possible to suppress rattling between the first path restricting member and the attaching member.

[2] It is preferable that the receiving portion is provided with a fitting-target portion, the lid is provided with a lid rotation portion that is configured to be rotatable about a thin hinge portion, and the lid rotation portion is provided with a lid fitting portion configured to be fitted into the fitting-target portion in a direction that intersects the lengthwise direction of the receiving portion when the lid rotation portion rotates.

With this configuration, the lid rotation portion is provided with a lid fitting portion configured to be fitted into the fitting-target portion in a direction that intersects the lengthwise direction of the receiving portion when the lid rotation portion rotates, and therefore the lid is prevented from becoming detached from the receiving portion. The lid fitting portion is configured to be fitted into the fitting-target portion in a direction that intersects the direction in which the slidable portion slides. Therefore, it is possible to strongly prevent the slidable portion from sliding. Therefore, it is possible to strongly prevent the lid from becoming detached from the receiving portion.

[3] It is preferable that the receiving portion is provided with a fitting-target portion and a rotation portion configured to be rotatable about a thin hinge portion, and the rotation portion is provided with a fitting portion configured to be fitted into the fitting-target portion in a direction that intersects the lengthwise direction of the receiving portion when the rotation portion rotates, and the rotation portion prevents the slidable portion from sliding, with the fitting portion being fitted into the fitting-target portion.

With this configuration, the rotation portion of the receiving portion is provided with a fitting portion that is fitted to the fitting-target portion of the receiving portion in a direction that intersects the lengthwise direction of the receiving portion when the rotation portion rotates. The rotation portion prevents the slidable portion from sliding, with the fitting portion being fitted into the fitting-target portion. Therefore, the lid is prevented from becoming detached from the receiving portion. The fitting portion is configured to be fitted into the fitting-target portion in a direction that intersects the direction in which the slidable portion slides. Therefore, it is possible to strongly prevent the slidable portion from sliding. Therefore, it is possible to strongly prevent the lid from becoming detached from the receiving portion.

[4] It is preferable that the rail portion is provided with an engaging protrusion that engages with the slidable portion in a direction in which the lid attached to the receiving portion becomes detached therefrom, while allowing the slidable portion engaging with the rail portion to slide.

With this configuration, the rail portion is provided with an engaging protrusion that engages with the slidable portion in a direction in which the lid attached to the receiving portion becomes detached therefrom, while allowing the slidable portion engaging with the rail portion to slide. Therefore, the lid is prevented from becoming detached from the receiving portion.

[5] It is preferable that the rail portion is provided so as to extend over the entirety of the receiving portion in the lengthwise direction thereof.

With this configuration, the rail portion is provided so as to extend over the entirety of the receiving portion in the lengthwise direction thereof. Therefore, for example, it becomes possible to attach the lid in both directions in the lengthwise direction of the receiving portion.

[6] It is preferable that, when viewed in a radial direction of the receiving portion, the rail portion is provided with a rail main body groove that is inclined with respect to the lengthwise direction of the receiving portion so as to gradually extend away from an end portion of the receiving portion in a circumferential direction thereof, a branch groove that branches from a base end side of the rail main body groove and extends in a direction away from an end portion of the receiving portion in the circumferential direction thereof, and a lock-target groove that is bent from a leading end side of the branch groove and extends in parallel to the lengthwise direction of the receiving portion, the slidable portion is provided with a slidable main body portion that is provided on one end side in a lengthwise direction of the lid and that is configured to be movable while being fitted into the rail main body groove, and a locking portion that is provided on the other end side in the lengthwise direction of the lid and that is configured to be movable while being fitted into the branch groove and the lock-target groove, and the lid is attached to the receiving portion with the slidable main body portion being positioned on a leading end side of the rail main body groove and the locking portion being positioned in the lock-target groove.

With this configuration, it is possible to attach the lid to the receiving portion in a direction inclined with respect to the lengthwise direction of the receiving portion. Therefore, it is easier to perform attachment work.

[7] It is preferable that the attaching member is a second path restricting member that is attached to the outer circumferential surface of the exterior member and is configured to restrict the path of the wire harness main body, and the receiving portion is provided at an end portion of the second path restricting member in a lengthwise direction thereof, and covers a portion in a circumferential direction of an end portion of the first path restricting member in the lengthwise direction thereof.

With this configuration, the receiving portion is provided at an end portion of the second path restricting member in the lengthwise direction thereof so as to cover a portion in a circumferential direction of an end portion of the first path restricting member in the lengthwise direction thereof. Therefore, the first path restricting member and the second path restricting member are coupled to each other in the lengthwise direction thereof. Therefore, the path of the wire harness main body is continuously restricted by the first path restricting member and the second path restricting member.

[8] It is preferable that the first path restricting member is configured to restrict a path of a straight section that is included in the path of the wire harness main body, and the second path restricting member is configured to restrict a path of a bent section that is included in the path of the wire harness main body.

With this configuration, the path of the straight section is restricted by the first path restricting member, and the path of the bent section is restricted by the second path restricting member. As a result, the path of the straight section and the path of the bent section of the wire harness are continuously restricted from deviating from the respective desired paths thereof.

Details of Embodiments of Present Disclosure

The following describes specific examples of a wire harness according to the present disclosure with reference to the drawings. In each drawing, for convenience of explanation, some parts of the configuration may be exaggerated or simplified. In addition, the dimensional ratio of each part may differ in each drawing. The terms "parallel" and "orthogonal" in the present specification are not limited to being strictly parallel and orthogonal, but may be substantially parallel and orthogonal within the range in which the actions and effects of the embodiments can be exhibited. It should be noted that the present disclosure is not limited to these examples, and is indicated by the scope of claims, and is intended to include all modifications within the meaning and scope equivalent to the scope of claims.

Overall Configuration of Wire Harness 10

A wire harness 10 shown in FIG. 1 is to be mounted in a vehicle V such as a hybrid vehicle or an electric vehicle, for example. The wire harness 10 electrically connects two or more on-board devices to each other. The on-board devices are electric devices mounted in the vehicle V. The wire harness 10 electrically connects, for example, an inverter M1 that is installed in a front portion of the vehicle V and a high-voltage battery M2 that is installed rearward of the inverter M1 in the vehicle V, to each other. The wire harness 10 is formed in an elongated shape so as to extend in a front-rear direction of the vehicle V, for example. The wire harness 10 is routed in the vehicle V so that, for example, an intermediate portion of the wire harness 10 in the lengthwise direction thereof passes outside the vehicle interior such as under the floor of the vehicle V.

The inverter M1 is, for example, connected to a motor (not shown) for driving wheels, which serves as a power source when the vehicle travels. The inverter M1 generates AC power from the DC power of the high-voltage battery M2, and supplies the AC power to a motor. The high-voltage battery M2 is, for example, a battery that is capable of supplying a voltage of several hundred volts.

The wire harness 10 includes a wire harness main body 11. The wire harness main body 11 includes an electric wire member 20 (electric wire) and a tubular exterior member 30 (exterior tube) that covers the outer circumferential surface of the electric wire member 20. The wire harness 10 has connectors C1 and C2 that are respectively attached to two end portions of the electric wire member 20. One end portion of the electric wire member 20 in the lengthwise direction thereof is connected to the inverter M1 via the connector C1, and the other end portion of the electric wire member 20 in the lengthwise direction thereof is connected to the high-voltage battery M2 via the connector C2.

Figure 2:
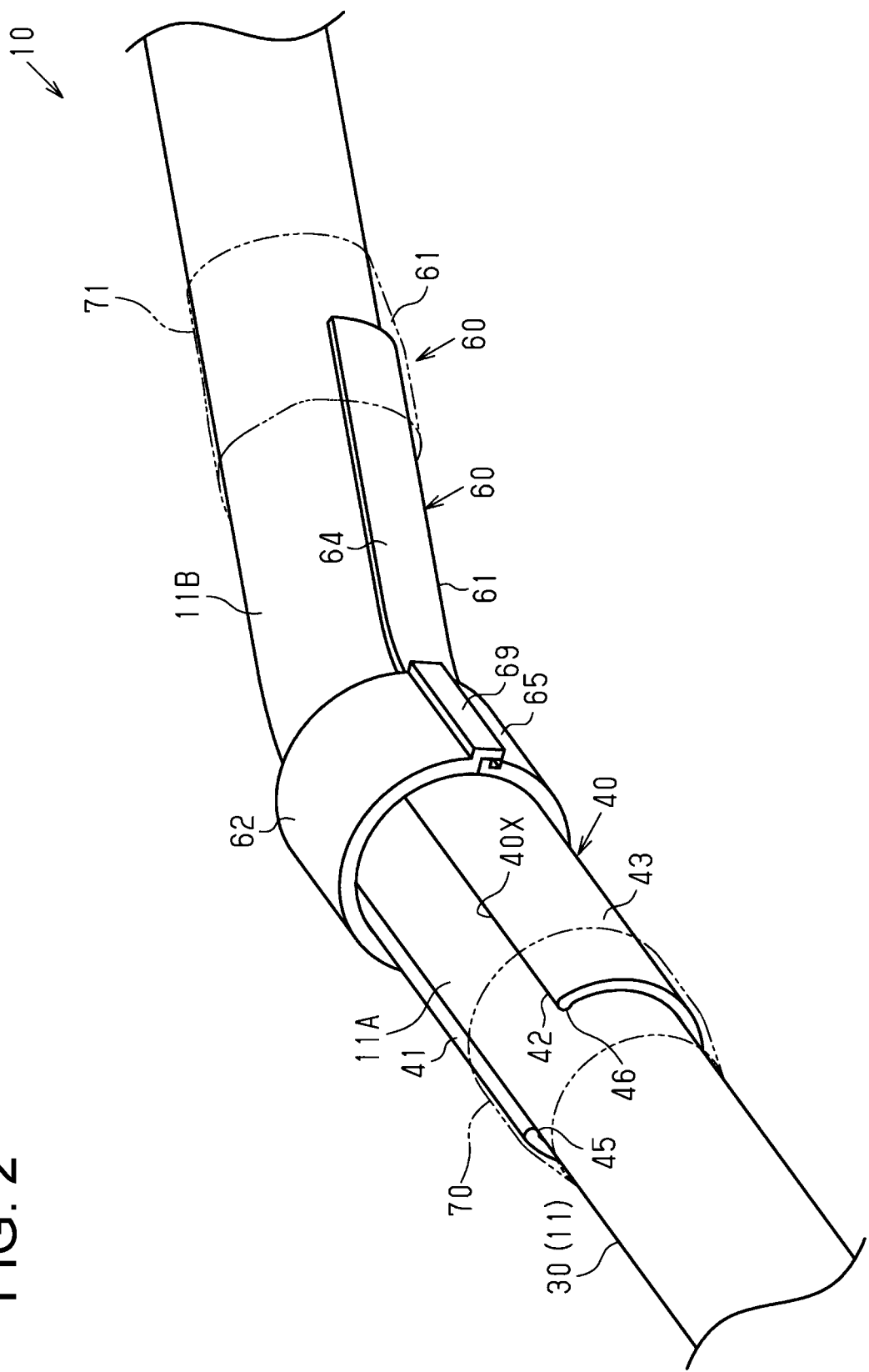
FIG. 2 is a schematic perspective view showing a wire harness according to an embodiment.
Figure 3:
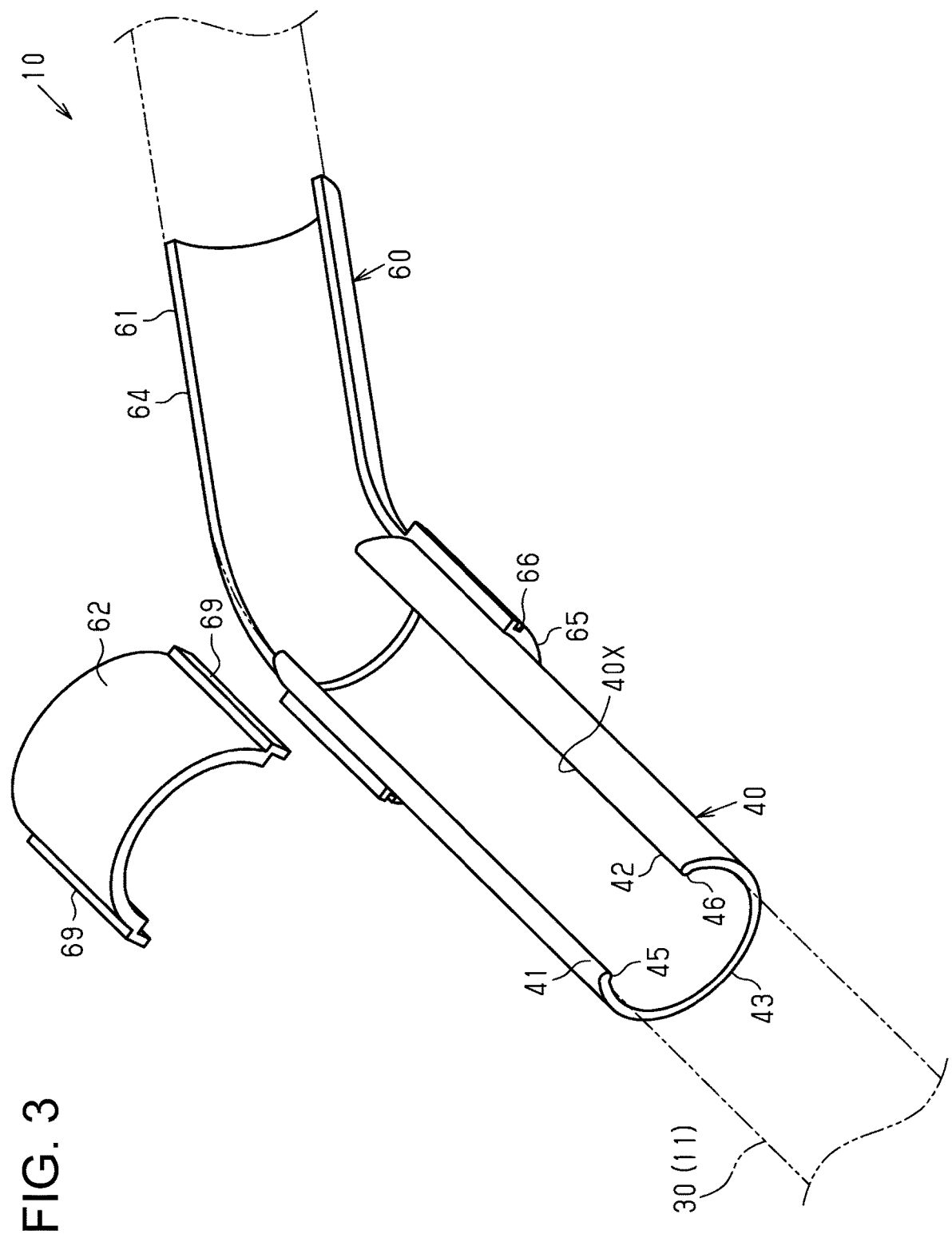
FIG. 3 is a schematic exploded perspective view showing a wire harness according to an embodiment.

As shown in FIGS. 2 and 3, the wire harness 10 includes a first path restricting member 40 that is attached to the outer circumferential surface of the exterior member 30 and a second path restricting member 60 that is attached to the outer circumferential surface of the exterior member 30 and serves as the attaching member (attachment). The first path restricting member 40 and the second path restricting member 60 restrict the path along which the wire harness main body 11 is routed. Note that the first path restricting member 40 and the second path restricting member 60 are omitted from FIG. 1.

Configuration of Electric Wire Member 20

Figure 4:
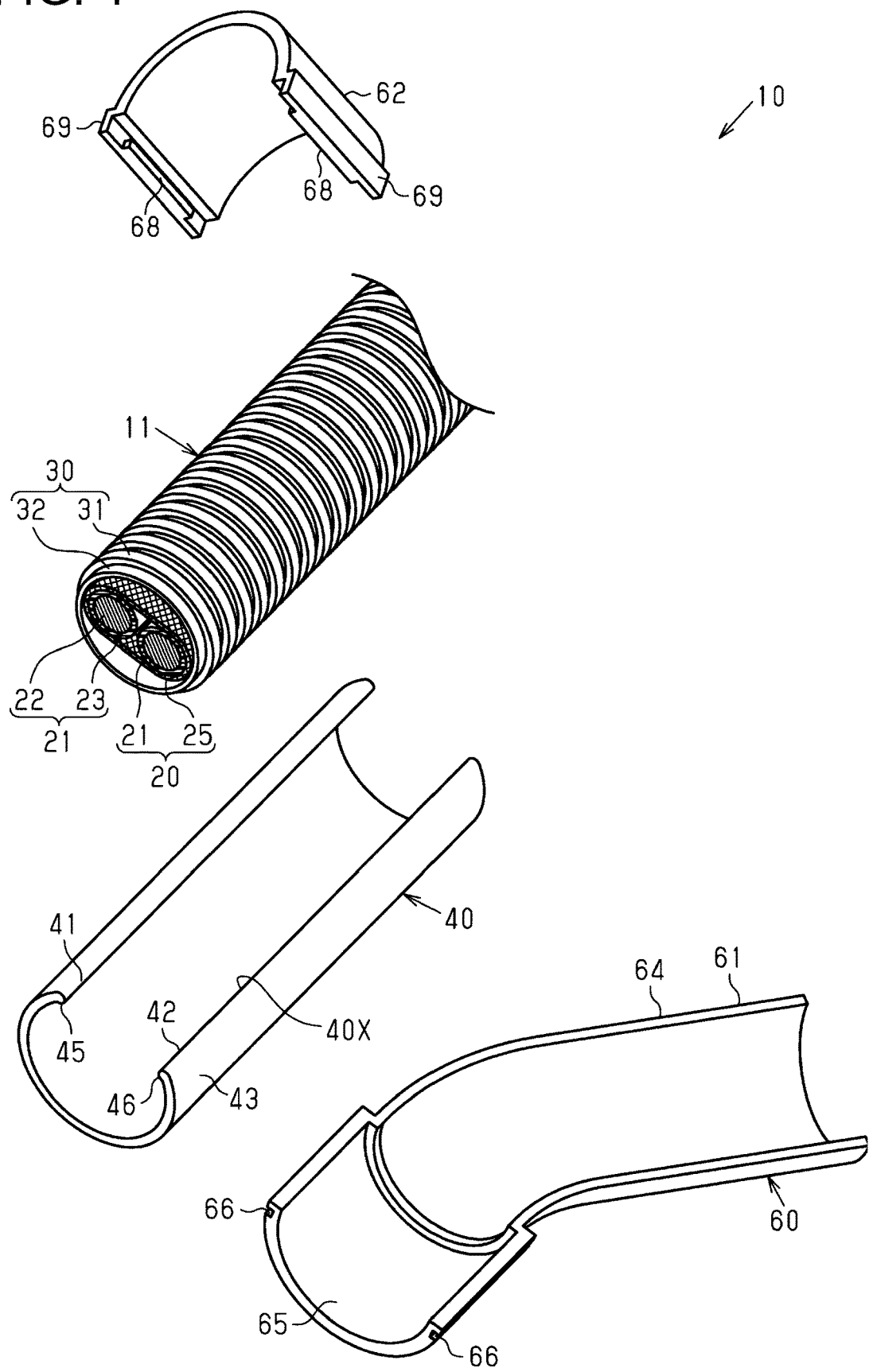
FIG. 4 is a schematic exploded perspective view showing a wire harness according to an embodiment.
Figure 7:
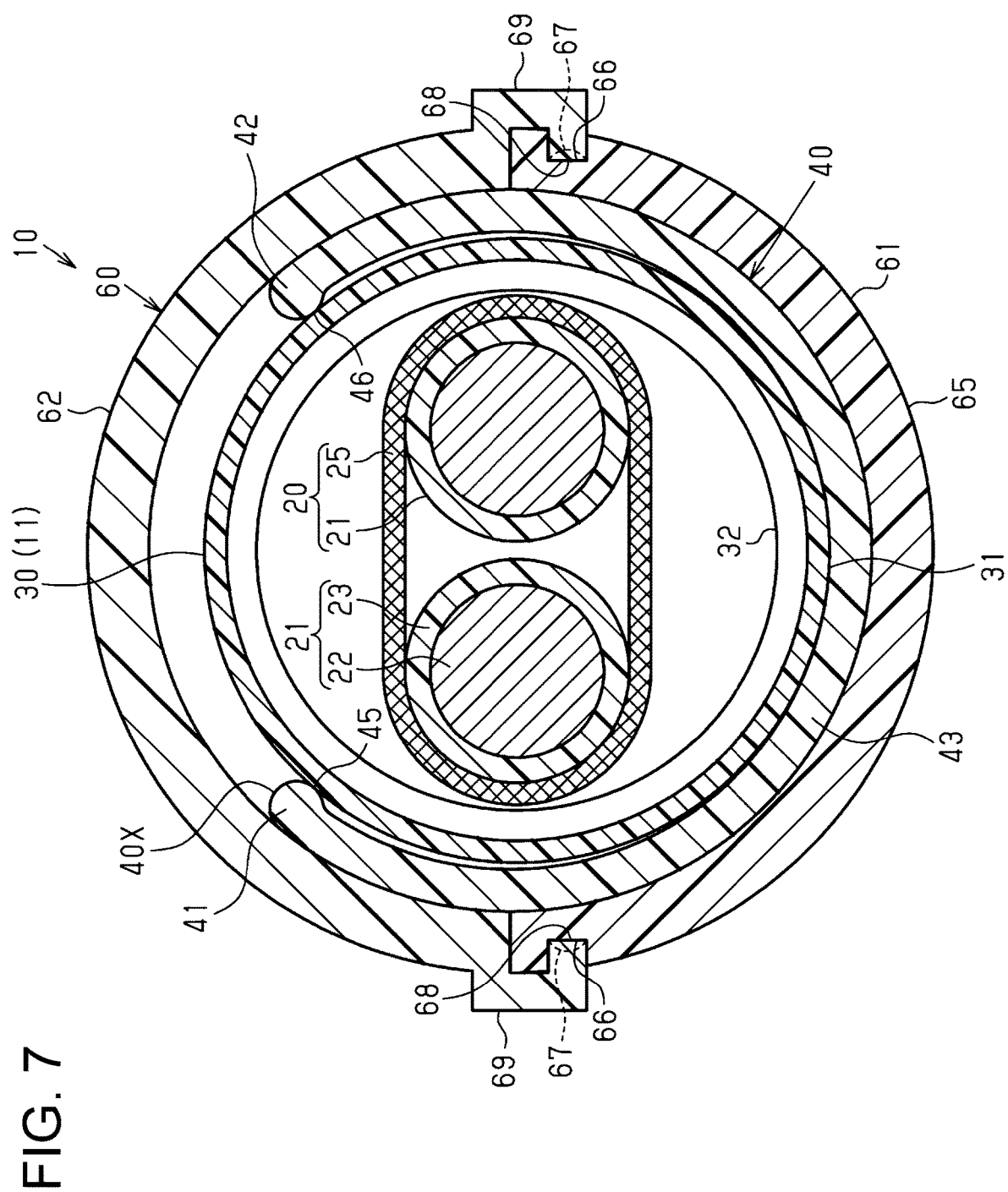
FIG. 7 is a schematic horizontal cross-sectional view showing a wire harness according to an embodiment.

As shown in FIGS. 4 and 7, for example, the electric wire member 20 includes one or more electric wires 21, specifically two electric wires 21 in the present embodiment, and a braided member 25 that collectively encloses the outer circumferential surfaces of the plurality of electric wires 21.

As shown in FIG. 7, each electric wire 21 is a coated electric wire that includes a conductive core wire 22 and an insulating coating 23 that encloses the outer circumferential surface of the core wire 22 and has insulating properties. Each electric wire 21 is, for example, a high-voltage electric wire that supports a high voltage and a large current. Each electric wire 21 may be, for example, a non-shielded electric wire that does not have an electromagnetic shield structure therewith, or a shielded electric wire that has an electromagnetic shield structure therewith. Each electric wire 21 in the present embodiment is a non-shielded electric wire.

As the core wire 22, a stranded wire that is constituted by a plurality of metal strands twisted together, a single core wire that is constituted by a single conductor, or the like may be used, for example. As the single core wire, a columnar conductor that is constituted by one columnar metal rod with a solid internal structure, a tubular conductor with a hollow internal structure, or the like may be used, for example. As the core wire 22, a combination of a stranded wire, a columnar conductor, or a tubular conductor may be used. As the material of the core wire 22, a metal material such as a copper-based material or an aluminum-based material may be used, for example.

The insulating coating 23 covers, for example, all the way around the outer circumferential surface of the core wire 22. The insulating coating 23 is constituted by, for example, a resin material that has insulating properties.

The cross-sectional shape of each wire 21 cut along a plane that is orthogonal to the lengthwise direction of each wire 21, i.e., the lateral cross-sectional shape of each wire 21, may be any shape. The lateral cross-sectional shape of each electric wire 21 may be, for example, a circular shape, a semi-circular shape, a polygonal shape, a square shape, a flat shape, or the like. The lateral cross-sectional shape of each electric wire 21 in the present embodiment is a circular shape.

The braided member 25 has, for example, a tubular shape that collectively encloses the outer circumferential surfaces of the plurality of electric wires 21. As the braided member 25, a braided wire in which a plurality of metal strands are braided or a braided wire in which metal strands and resin strands are braided in combination with each other may be used, for example. As the material of the metal strands, a metal material such as a copper-based material or an aluminum-based material may be used, for example. Although not shown in the drawings, the two end portions of the braided member 25 in the lengthwise direction are grounded at, for example, the connectors C1 and C2 (see FIG. 1).

Configuration of Exterior Member 30

As shown in FIG. 4, the exterior member 30 has a tubular shape that encloses all the way around the outer circumferential surface of the electric wire member 20. The exterior member 30 in the present embodiment is formed in a cylindrical shape. The exterior member 30 is, for example, provided with a circumferential wall that is formed so as to be continuous all the way around the circumferential surface of the exterior member 30. The exterior member 30, for example, seals the inside of the exterior member 30 all the way around the circumferential surface thereof. The exterior member 30 has, for example, a function of protecting the electric wire member 20 from flying objects and water droplets.

The exterior member 30 is, for example, flexible and easy to bend. Examples of the flexible exterior member 30 include a resin corrugated tube and a rubber waterproof cover. The exterior member 30 in the present embodiment is a resin corrugated tube that has a bellowed shape in which the diameter repeatedly increases and decreases in the lengthwise direction of the exterior member 30. That is to say, the exterior member 30 in the present embodiment has a bellowed structure in which large-diameter portions 31 and small-diameter portions 32 that have a smaller diameter than the large-diameter portions 31 are alternately provided in the lengthwise direction of the exterior member 30. The large-diameter portions 31 and the small-diameter portions 32 each have an annular shape that extends around the exterior member 30 in the circumferential direction thereof, for example. As the material of the exterior member 30, a synthetic resin such as polyolefin, polyamide, polyester, or an ABS resin may be used, for example. In FIGS. 1 to 3, the exterior member 30 is simplified in order to simplify the drawings.

Configurations of First Path Restricting Member 40 and Second Path Restricting Member 60

As shown in FIGS. 2 and 3, the first path restricting member 40 and the second path restricting member 60 each hold the exterior member 30. The first path restricting member 40 and the second path restricting member 60 are each more rigid than the exterior member 30, for example. Compared to the outer member 30, the first path restricting member 40 and the second path restricting member 60 are each more rigid so as to be less bendable in a direction orthogonal to the lengthwise direction of the wire harness main body 11. With this configuration, the first path restricting member 40 and the second path restricting member 60 each restrict the path of the wire harness main body 11. For example, the first path restricting member 40 and the second path restricting member 60 each assist the exterior member 30 so that the wire harness main body 11 does not bend under its own weight or the like and does not deviate from a desired path.

As shown in FIG. 2, the first path restricting member 40 is provided along a portion of the wire harness main body 11 in the lengthwise direction thereof. For example, the first path restricting member 40 is attached to the outer circumferential surface of the exterior member 30 along a straight section 11A, which is a straight section of the path of the wire harness main body 11. The first path restricting member 40 is configured to restrict the path of the wire harness main body 11 in the straight section 11A. Here, the straight section 11A is a section in which the path of the wire harness main body 11 extends straight in one direction. Note that one or more first path restricting members 40 are provided depending on the path of the wire harness main body 11.

The second path restricting member 60 is provided along a portion of the wire harness main body 11 in the lengthwise direction thereof. For example, the second path restricting member 60 is attached to the outer circumferential surface of the exterior member 30 along a bent section 11B, which is a bent section of the path of the wire harness main body 11. The second path restricting member 60 is configured to restrict the path of the wire harness main body 11 in the bent section 11B. Here, the bent section 11B is a section in which the path of the wire harness main body 11 is bent so as to deviate from a straight line. Note that one or more second path restricting members 60 may be provided depending on the path of the wire harness main body 11.

Configuration of First Path Restricting Member 40

As shown in FIG. 7, the first path restricting member 40 covers a portion of the outer circumferential surface of the exterior member 30 in the circumferential direction of the exterior member 30. The first path restricting member 40 has a shape that covers a portion of the outer circumferential surface of the exterior member 30 in the circumferential direction thereof. The first path restricting member 40 has a C-like horizontal cross-sectional shape as a whole. For example, the first path restricting member 40 covers a range larger than half of the outer circumferential surface of the exterior member 30. That is to say, the first path restricting member 40 covers a range larger than half of the outer circumferential of the exterior member 30 in the circumferential direction of the exterior member 30. As shown in FIG. 2, the first path restricting member 40 extends along the straight section 11A in the lengthwise direction of the exterior member 30. For example, the first path restricting member 40 is formed in a shape that extends straight in one direction. For example, the horizontal cross-sectional shape of the first path restricting member 40 is uniform over the entirety of the first path restricting member 40 in the lengthwise direction thereof.

The first path restricting member 40 is made of metal or resin, for example. The first path restricting member 40 in the present embodiment is made of resin. As the material of the first path restricting member 40, a synthetic resin such as polypropylene, polyamide, or polyacetal may be used, for example. The first path restricting member 40 may be manufactured using a well-known manufacturing method such as extrusion molding or injection molding, for example. In the present embodiment, the first path restricting member 40 is an extrusion-molded part manufactured through extrusion molding. Therefore, it is easy to manufacture the first path restricting member 40 by using an extrusion molding machine that extrudes the raw material of the first path restricting member 40 in the lengthwise direction thereof. Also, it is possible to manufacture a plurality of types of first path restricting members 40 with different sizes in the lengthwise direction thereof by using a single extrusion molding machine. For example, it is possible to manufacture a plurality of types of first path restricting members 40 with different sizes in the lengthwise direction thereof by cutting the base material of the first path restricting member 40 formed using a single extrusion molding machine, at any desired length, using a cutting machine.

The path restricting member 40 is provided with an insertion port 40X that is open in a direction orthogonal to the lengthwise direction of the path restricting member 40. The insertion port 40X extends over the entirety of the first path restricting member 40 in the lengthwise direction thereof. The first path restricting member 40 includes a first end portion 41 and a second end portion 42 that are two end portions of the first path restricting member 40 in the circumferential direction thereof and define the insertion port 40X. The first path restricting member 40 includes a coupling portion 43 that couples the first end portion 41 and the second end portion 42 to each other. In other words, the first path restricting member 40 includes a coupling portion 43 that is formed so as to cover a portion of the exterior member 30 in the circumferential direction thereof, the first end portion 41 and the second end portion 42 that are provided at two end portions of the coupling portion 43, and the insertion port 40X that is defined by the first end portion 41 and the second end portion 42.

As shown in FIG. 7, the coupling portion 43 constitutes a main portion of the first path restricting member 40. The thickness of the coupling portion 43 in a radial direction is uniform in the circumferential direction of the first path restricting member 40, for example. The horizontal cross-sectional shape of the coupling portion 43 is a shape that matches the outer surface of the exterior member 30. For example, the first end portion 41, the second end portion 42, and the coupling portion 43 each have an arc-like horizontal cross-sectional shape.

The first end portion 41 and the second end portion 42 are provided opposite to each other in the circumferential direction of the first path restricting member 40. The first end portion 41 and the second end portion 42 are separated from each other in the circumferential direction of the first path restricting member 40 with the insertion port 40X being interposed therebetween. In other words, the gap between the first end portion 41 and the second end portion 42 in the circumferential direction of the first path restricting member 40 is provided as the insertion port 40X. As described above, the first path restricting member 40 is formed in a C shape in which the insertion port 40X is provided at a portion of the first path restricting member 40 in the circumferential direction thereof.

The respective leading ends of the first end portion 41 and the second end portion 42 each have a curved horizontal cross-sectional shape. The respective leading ends of the first end portion 41 and the second end portion 42 in the present embodiment each have a circular arc horizontal cross-sectional shape.

The first path restricting member 40 includes a protruding portion 45 that protrudes from the inner surface of the first end portion 41, and a protruding portion 46 that protrudes from the inner surface of the second end portion 42. The protruding portions 45 and 46 each protrude toward the exterior member 30 inserted into the first path restricting member 40, and come into contact with the outer surface of the exterior member 30. The protruding portions 45 and 46 each come into contact with the outer surfaces of the large-diameter portions 31 of the exterior member 30. For example, the protruding portion 45 protrudes from the inner surface of the leading end of the first end portion 41. For example, the protruding portion 46 protrudes from the inner surface of the leading end of the second end portion 42. For example, the protruding portions 45 and 46 each have a curved horizontal cross-sectional shape. The protruding portions 45 and 46 in the present embodiment each have a circular arc horizontal cross-sectional shape.

As shown in FIG. 3, the protruding portions 45 and 46 extend in the lengthwise direction of the first path restricting member 40. For example, the protruding portions 45 and 46 each extend over the full length of the first path restricting member 40 in the lengthwise direction thereof.

The protruding portions 45 and 46 each press the exterior member 30 from the outside of the exterior member 30. The exterior member 30 is elastically held by the protruding portion 45, the protruding portion 46, and the coupling portion 43. As a result, the first path restricting member 40 is firmly coupled to the exterior member 30.

As shown in FIG. 7, the opening width of the insertion port 40X, i.e., the shortest distance between the first end portion 41 and the second end portion 42, is smaller than the outer diameter of the exterior member 30.

The opening width of the insertion port 40X increases as a result of the first path restricting member 40 elastically deforming. For example, the opening width of the insertion port 40X increases as a result of the exterior member 30 being inserted into the insertion port 40X in a direction orthogonal to the lengthwise direction of the first path restricting member 40. When the exterior member 30 is inserted into the first path restricting member 40, the first path restricting member 40 elastically deforms to return to the original shape thereof. As a result, the opening width of the insertion port 40X becomes smaller than the outer diameter of the exterior member 30, and the first path restricting member 40 is attached to the outer circumferential surface of the exterior member 30.

Configuration of Second Path Restricting Member 60

As shown in FIG. 2, the second path restricting member 60 is attached to the outer circumferential surface of a portion of the first path restricting member 40 in the lengthwise direction thereof. The second path restricting member 60 is attached to the outer circumferential surface of an end portion of the first path restricting member 40 in the lengthwise direction thereof. The second path restricting member 60 is attached to the outer circumferential surface of the exterior member 30 in the bent section 11B. The second path restricting member 60 extends in the lengthwise direction of the exterior member 30 in the bent section 11B. The second path restricting member 60 is bent along the shape of the bent section 11B, for example.

The second path restricting member 60 includes a second path restricting main body 61 and a lid 62.

The second path restricting main body 61 and the lid 62 included in the second path restricting member 60 are each made of metal or resin, for example. The second path restricting main body 61 and the lid 62 in the present embodiment are made of resin. As the material of the second path restricting main body 61 and the lid 62, a synthetic resin such as polypropylene, polyamide, or polyacetal may be used, for example. The second path restricting main body 61 and the lid 62 may be manufactured using a well-known manufacturing method such as injection molding, for example.

The second path restricting main body 61 includes a main body portion 64 (main body) and a receiving portion 65 (receiver).

The main body portion 64 covers a portion of the outer circumferential surface of the exterior member 30 in the circumferential direction of the exterior member 30. The main body portion 64 has a shape that covers a portion of the outer circumferential surface of the exterior member 30 in the circumferential direction of the exterior member 30. The main body portion 64 has a semi-cylindrical horizontal cross-sectional shape as a whole. The main body portion 64 covers half of the outer circumference of the exterior member 30. As shown in FIG. 2, the main body portion 64 extends in the lengthwise direction of the exterior member 30 in the bent section 11B. The main body portion 64 is bent along the shape of the bent section 11B.

The receiving portion 65 is provided at an end portion of the second path restricting member 60 in the lengthwise direction thereof, which is an end portion of the main body portion 64 in the lengthwise direction thereof. The receiving portion 65 covers a portion of the outer circumferential surface of the first path restricting member 40 in the circumferential direction of the first path restricting member 40. The receiving portion 65 covers a portion in a circumferential direction of an end portion of the first path restricting member 40 in the lengthwise direction thereof. The receiving portion 65 covers a portion of the outer circumferential surface of the first path restricting member 40 in the circumferential direction of the first path restricting member 40. The receiving portion 65 has a semi-cylindrical horizontal cross-sectional shape as a whole. The receiving portion 65 has a semi-cylindrical shape with a diameter larger than that of the main body portion 64. The receiving portion 65 covers half of the outer circumference of the first path restricting member 40.

Figure 5:
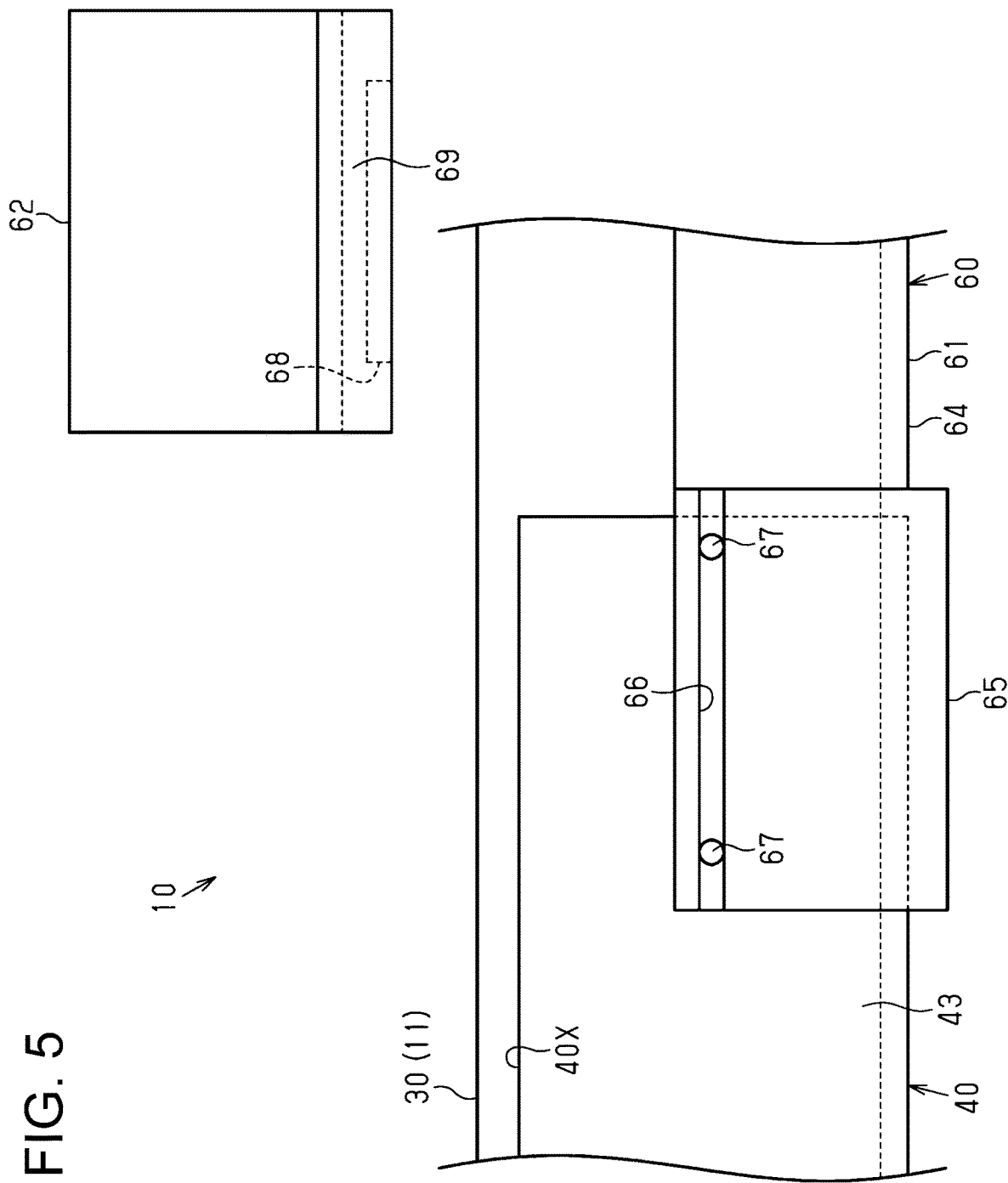
FIG. 5 is a schematic exploded side view showing a wire harness according to an embodiment.
Figure 6:
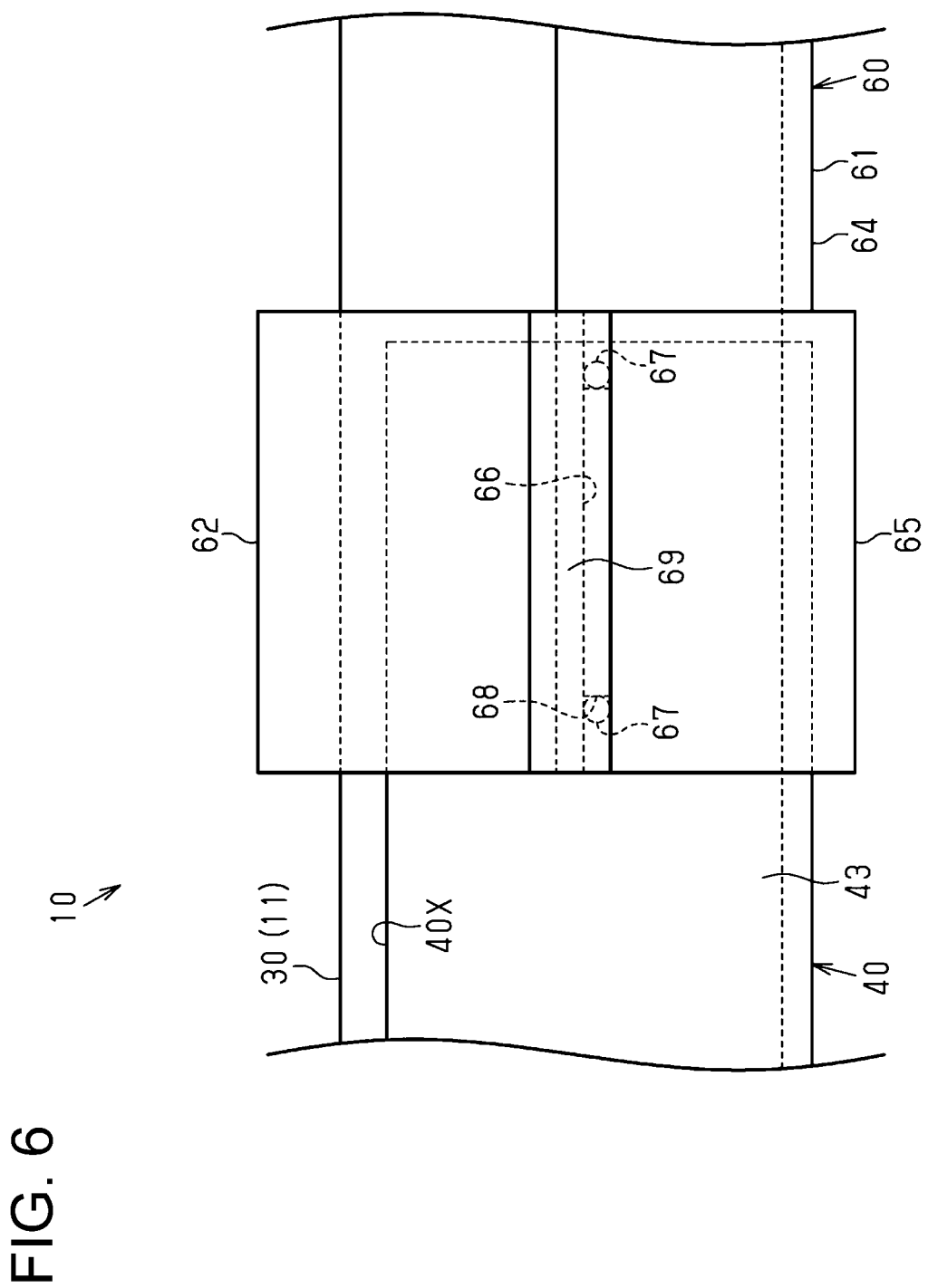
FIG. 6 is a schematic side view showing a wire harness according to an embodiment.

As shown in FIGS. 5 to 7, the receiving portion 65 is provided with rail portions 66 (rails) that extend in the lengthwise direction of the second path restricting member 60, which is the lengthwise direction of the receiving portion 65. Each rail portion 66 is a groove that is provided so as to be recessed from the outer circumferential surface of the receiving portion 65. Each rail portion 66 in the present embodiment is not inclined with respect to the lengthwise direction of the receiving portion 65, and extends parallel to the lengthwise direction of the receiving portion 65. The rail portions 66 are respectively provided close to two end portions of the receiving portion 65 in the circumferential direction thereof. Each rail portion 66 is provided so as to extend over the entirety of the receiving portion 65 in the lengthwise direction thereof. In other words, the rail portions 66 are open in two end portions of the receiving portion 65 in the lengthwise direction thereof. Each rail portion 66 has engaging protrusions 67. As shown in FIG. 5, two engaging protrusions 67 are provided in the lengthwise direction of the rail portions 66. The engaging protrusions 67 are provided on the rail portions 66, respectively close to end portions of the rail portions 66 in the lengthwise direction thereof. The engaging protrusions 67 protrude outward from the bottom of the rail portion 66 in a radial direction of the receiving portion 65. Each engaging protrusion 67 has a spherical shape. Specifically, each engaging protrusion 67 has a shape obtained by cutting a portion of a sphere that is smaller than half of the sphere along one plane.

The lid 62 covers the entirety of the first path restricting member 40 in the circumferential direction thereof, together with the receiving portion 65. Specifically, the lid 62 covers all the way around the outer circumferential surface of the first path restricting member 40 in the circumferential direction, together with the receiving portion 65. The lid 62 in the present embodiment covers a portion of the outer circumferential surface of the first path restricting member 40 and the portion of the outer circumferential surface of the exterior member 30 exposed from the insertion port 40X. The lid 62 has a semi-cylindrical horizontal cross-sectional shape as a whole. The lid 62 has a semi-cylindrical shape with the same diameter as the diameter of the receiving portion 65. The lid 62 covers a portion not covered by the receiving portion 65, of the outer circumferential surface of the first path restricting member 40 in the circumferential direction thereof, which corresponds to half of the range of the outer circumferential surface of the first path restricting member 40 in the circumferential direction thereof.

As shown in FIGS. 4 to 7, the lid 62 is provided with slidable portions 68 (slide). Slidable portions 68 are slidable along the rail portions 66 while engaging with the rail portions 66 so that the lid 62 does not become detached from the receiving portion 65.

Specifically, as shown in FIG. 7, first, two end portions of the lid 62 in the circumferential direction thereof are respectively provided with extension portions 69 that protrude outward in the radial direction of the lid 62 and are thereafter bent so as to face the rail portions 66. The leading ends of the extension portions 69 are respectively provided with the slidable portions 68 that protrude inward in the radial direction of the lid 62 and are fitted into the rail portions 66. As shown in FIGS. 5 and 6, the slidable portions 68 extend in the lengthwise direction of the lid 62. The lid 62 faces the receiving portion 65 as a result of the slidable portions 68 sliding along the rail portions 66 while being fitted into, and engaging with, the rail portions 66, and is attached so as to sandwich the first path restricting member 40 together with the receiving portion 65. That is to say, the receiving portion 65 and the lid 62 sandwich the first path restricting member 40 with the slidable portions 68 being fitted into and engaging with the rail portions 66.

The slidable portions 68 are located between the engaging protrusions 67 with the lid 62 being attached to the receiving portion 65. In other words, the slidable portions 67 are respectively located on the two sides of the slidable portions 68 with the lid 62 being attached to the receiving portion 65. Here, the engaging protrusions 67 allow the slidable portions 68 that are fitted into and engaging with the rail portions 66, to move. That is to say, the engaging protrusions 67 protrude to such an extent that the slidable portions 68 can run over the engaging protrusions 67 when the lid 62 is attached to the receiving portion 65, as a result of the lid 62 bending slightly, for example. Also, the engaging protrusions 67 engage with the slidable portions 68 in a direction in which the lid 62 attached to the receiving portion 65 becomes detached therefrom, to prevent the lid 62 from becoming detached from the receiving portion 65. That is to say, the engaging protrusions 67 engages with the slidable portions 68 so that, even if a small force of vibration or the like is applied to the second path restricting member 60, the lid 62 attached to the receiving portion 65 does not slide in the lengthwise direction of the receiving portion 65.

Also, as shown in FIG. 2, the wire harness 10 is provided with a slide restricting member 70 that is configured to restrict the first path restricting member 40 from sliding in the lengthwise direction of the exterior member 30, for example. The wire harness 10 is provided with a slide restricting member 71 that is configured to restrict the second path restricting member 60 from sliding in the lengthwise direction of the exterior member 30, for example. Resin or metal band ties, caulking rings, adhesive tapes, or the like may be used as the slide restricting members 70 and 71, for example. The slide restricting members 70 and 71 in the present embodiment are pieces of adhesive tape. The slide restricting member 70 is wound around the end portion that is not coupled to the second path restricting member 60, of the first path restricting member 40, and the exterior member 30. The slide restricting member 71 is wound around the end portion that is not coupled to the first path restricting member 40, of the second path restricting member 60, and the exterior member 30.

Next, actions of the present embodiment will be described.

The receiving portion 65 and the lid 62 are kept in the state of sandwiching the first path restricting member 40, using the rail portions 66 and the slidable portions 68. Therefore, the state in which the first path restricting member 40 and the second path restricting member 60 are coupled to each other is kept unchanged. Therefore, the path of the wire harness main body 11 is continuously restricted.

Next, effects of the above-described embodiment will be descried below.

(1) The receiving portion 65 is provided with rail portions 66 that extend in the lengthwise direction of the receiving portion 65, and the lid 62 is provided with slidable portions 68 that are slidable along the rail portions 66 while engaging with the rail portions 66 so that the lid 62 does not become detached from the receiving portion 65. Therefore, it is possible to prevent the receiving portion 65 and the lid 62 from becoming detached from each other. That is to say, when the lid 62 is attached to the receiving portion 65 as a result of the slidable portions 68 sliding while engaging with the rail portions 66, the rail portions 66 and the slidable portions 68 prevent the receiving portion 65 and the lid 62 from becoming detached from each other in a radial direction of the first path restricting member 40. As a result, for example, rattling of the receiving portion 65 and the lid 62 is suppressed compared to a configuration in which the lid 62 is formed integrally with the receiving portion 65 with a thin hinge portion (thin hinge) being interposed therebetween, and the lid 62 is locked to the receiving portion 65 as a result of claw portions engaging with each other in a closed state. That is to say, in a configuration with a thin hinge portion and claw portions, rattling is likely to occur between the receiving portion 65 and the lid 62 at the thin hinge portion and the claw portions. However, it is possible to prevent such rattling from occurring. Therefore, it is possible to sandwich the first path restricting member 40 between the receiving portion 65 and the lid 62 so as not cause rattling, and it is possible to suppress rattling between the first path restricting member 40 and the second path restricting member 60. As a result, for example, it is possible to prevent the attaching portion between the first path restricting member 40 and the second path restricting member 60 from being damaged, and accordingly it is possible to reliably restrict the path of the wire harness main body 11.

(2) While the rail portions 66 allow the slidable portions 68 engaging with the rail portions 66 to move, the rail portions 66 have engaging protrusions 67 engaging with the slidable portions 68 in a direction in which the lid 62 becomes detached from the receiving portion 65. Therefore, the lid 62 is prevented from becoming detached from the receiving portion 65.

(3) Each rail portion 66 is provided so as to extend over the entirety of the receiving portion 65 in the lengthwise direction thereof. Therefore, for example, it becomes possible to attach the lid 62 in both directions in the lengthwise direction of the receiving portion 65.

(4) The attaching member attached to the first path restricting member 40 is the second path restricting member 60 that is attached to the outer circumferential surface of the exterior member 30 and is configured to restrict the path of the wire harness main body 11. The receiving portion 65 is provided at an end portion of the second path restricting member 60 in the lengthwise direction thereof so as to cover a portion in a circumferential direction of an end portion of the first path restricting member 40 in the lengthwise direction thereof. Therefore, the first path restricting member 40 and the second path restricting member 60 are coupled to each other in the lengthwise direction thereof.

Therefore, the path of the wire harness main body 11 is continuously restricted by the first path restricting member 40 and the second path restricting member 60.

(5) The first path restricting member 40 is configured to restrict the path of the straight section 11A of the wire harness main body 11, and the second path restricting member 60 is configured to restrict the path of the bent section 11B of the wire harness main body 11. As a result, the path of the straight section 11A and the path of the bent section 11B of the wire harness main body 11 are continuously restricted from deviating from the respective desired paths thereof.

OTHER EMBODIMENTS

The above embodiment can be modified and implemented as follows. The above embodiment and the following modifications can be implemented in combination with each other as long as no contradiction arises.

In the above-described embodiment, the lid 62 has a semi-cylindrical shape with the same diameter as the diameter of the receiving portion 65. However, the shape of the lid 62 may be changed as long as the lid 62 covers all the way around the first path restricting member 40 together with the receiving portion 65.

Figure 8:
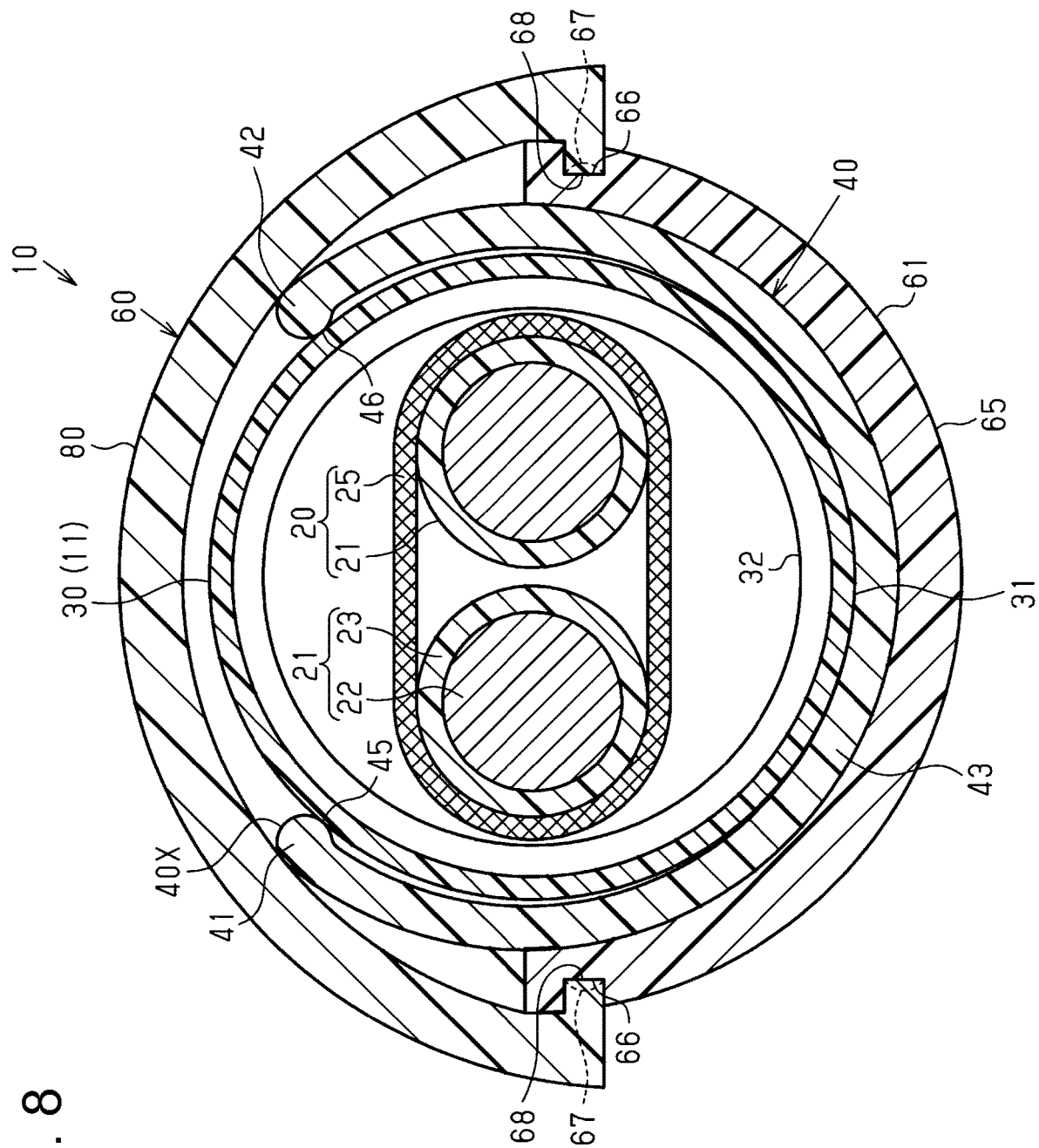
FIG. 8 is a schematic horizontal cross-sectional view showing a wire harness according to a modified example.

For example, as shown in FIG. 8, a lid 80 may have a circular arc shape with a diameter larger than the diameter of the receiving portion 65. Note that the lid 80 in this example is not provided with the extension portions 69 in the above embodiment. The slidable portions 68 protrudes inward in a radial direction of the lid 62 from the two ends of the lid 80 in the circumferential direction. With such a configuration, it is possible to achieve effects similar to the effects of the above-described embodiment.

In the above-described embodiment, the rail portions 66 are not inclined with respect to the lengthwise direction of the receiving portion 65, and extend parallel to the lengthwise direction of the receiving portion 65. However, the rail portions 66 may be configured to be inclined with respect to the lengthwise direction of the receiving portion 65 while extending in the lengthwise direction of the receiving portion 65. In this case, of course, it is necessary to change the configurations of the slidable portions 68 of the lid 62.

Figure 9:
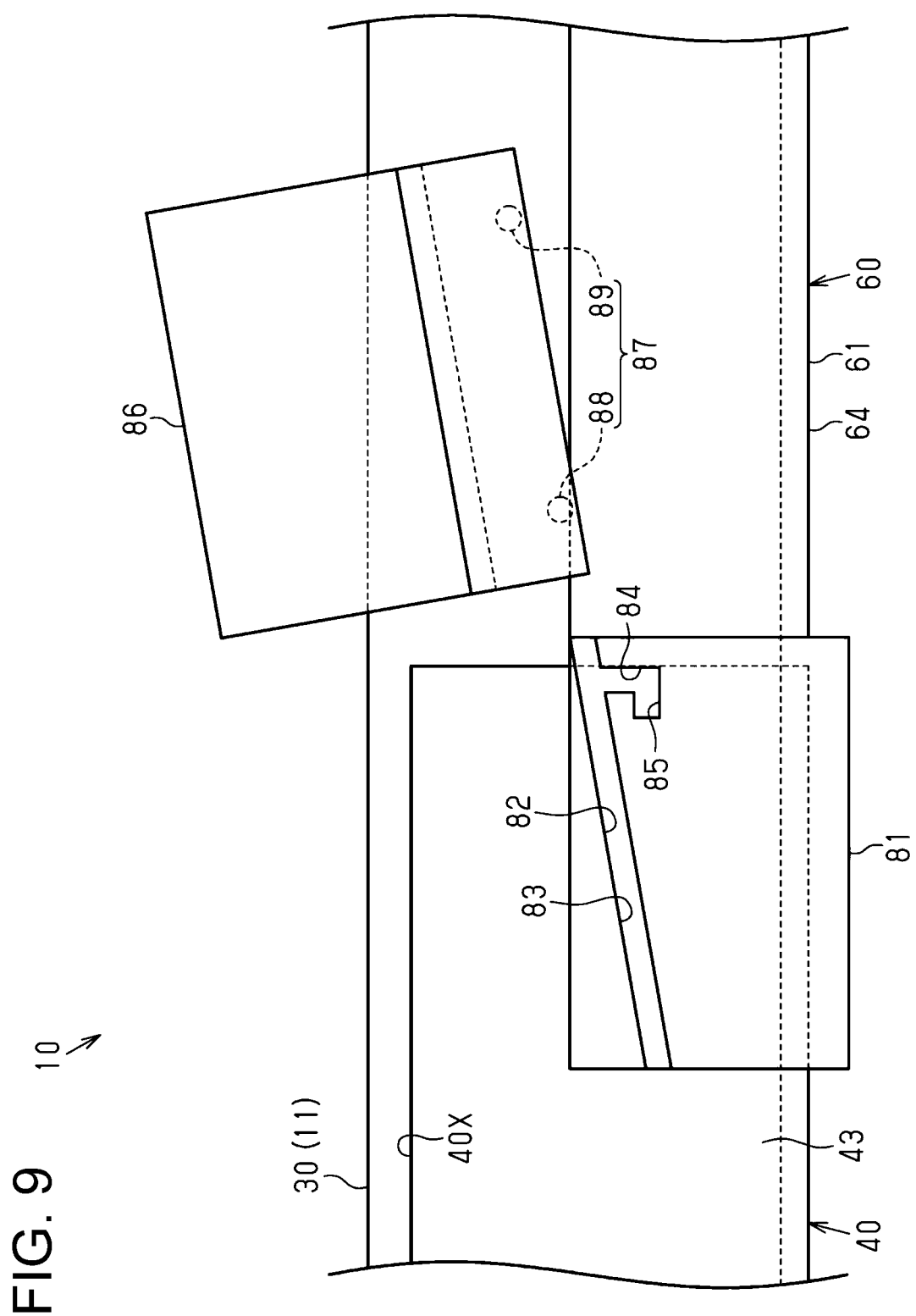
FIG. 9 is a schematic exploded side view showing a wire harness according to a modified example.
Figure 10:
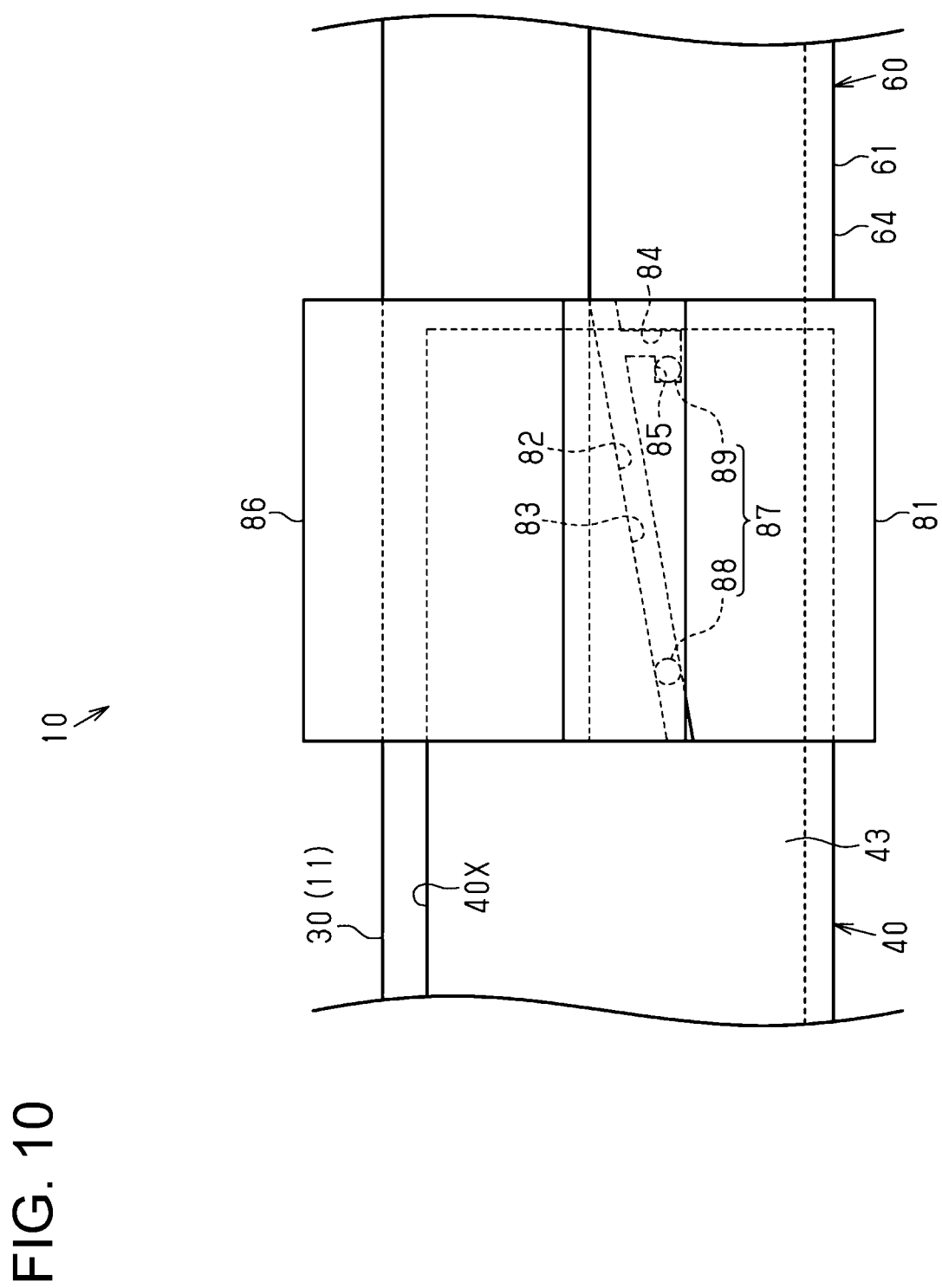
FIG. 10 is a schematic side view showing a wire harness according to a modified example.

For example, the configurations may be changed as shown in FIGS. 9 and 10. Each rail portion 82 of a receiving portion 81 in this example is provided with a rail main body groove 83 that is inclined with respect to the lengthwise direction of the receiving portion 81 so as to gradually extend away from the end portion of the receiving portion 81 in the circumferential direction when viewed in a radial direction of the receiving portion 81. In addition, each rail portion 82 is provided with a branch groove 84 that branches from a base end side of the rail main body groove 83 and extends in a direction away from an end portion of the receiving portion 81 in the circumferential direction thereof, and a lock-target groove 85 that is bent from a leading end side of the branch groove 84 and extends in parallel to the lengthwise direction of the receiving portion 81.

Each slidable portion 87 of a lid 86 in this example is provided with a slidable main body portion 88 that is provided on one end side in the lengthwise direction of the lid 86 and that can move while being fitted into the rail main body groove 83, and a locking portion 89 (lock) that is provided on the other end side in the lengthwise direction of the lid 86 and that can move while being fitted into the branch groove 84 and the lock-target groove 85.

As shown in FIG. 10, the lid 86 is attached to the receiving portion 81 with the slidable main body portion 88 being positioned on the leading end side of the rail main body groove 83 and the locking portion 89 being positioned in the lock-target groove 85. Specifically, the lid 86 is attached to the receiving portion 81 as a result of the slidable main body portion 88 sliding along the rail main body groove 83 while the slidable main body portion 88 is fitted into and engages with the rail main body groove 83 and thereafter the locking portion 89 being moved to reach the lock-target groove 85 via the branch groove 84. The lid 86 attached in this way sandwiches the first path restricting member 40 together with the receiving portion 81.

With such a configuration, it is possible to attach the lid 86 to the receiving portion 81 in a direction inclined with respect to the lengthwise direction of the receiving portion 81. Therefore, it is easier to perform attachment work.

In the above-described embodiment, the rail portions 66 is provided with the engaging protrusions 67 that engages with the slidable portions 68 to prevent the lid 62 from becoming detached from the receiving portion 65. However, it is possible to use another configuration to prevent the lid 62 from becoming detached from the receiving portion 65.

For example, the configuration may be changed as shown in FIGS. 11 to 14. In this example, the same reference numerals are given to the same configurations as in the above-described embodiment, and detailed description thereof will be omitted.

Figure 11:
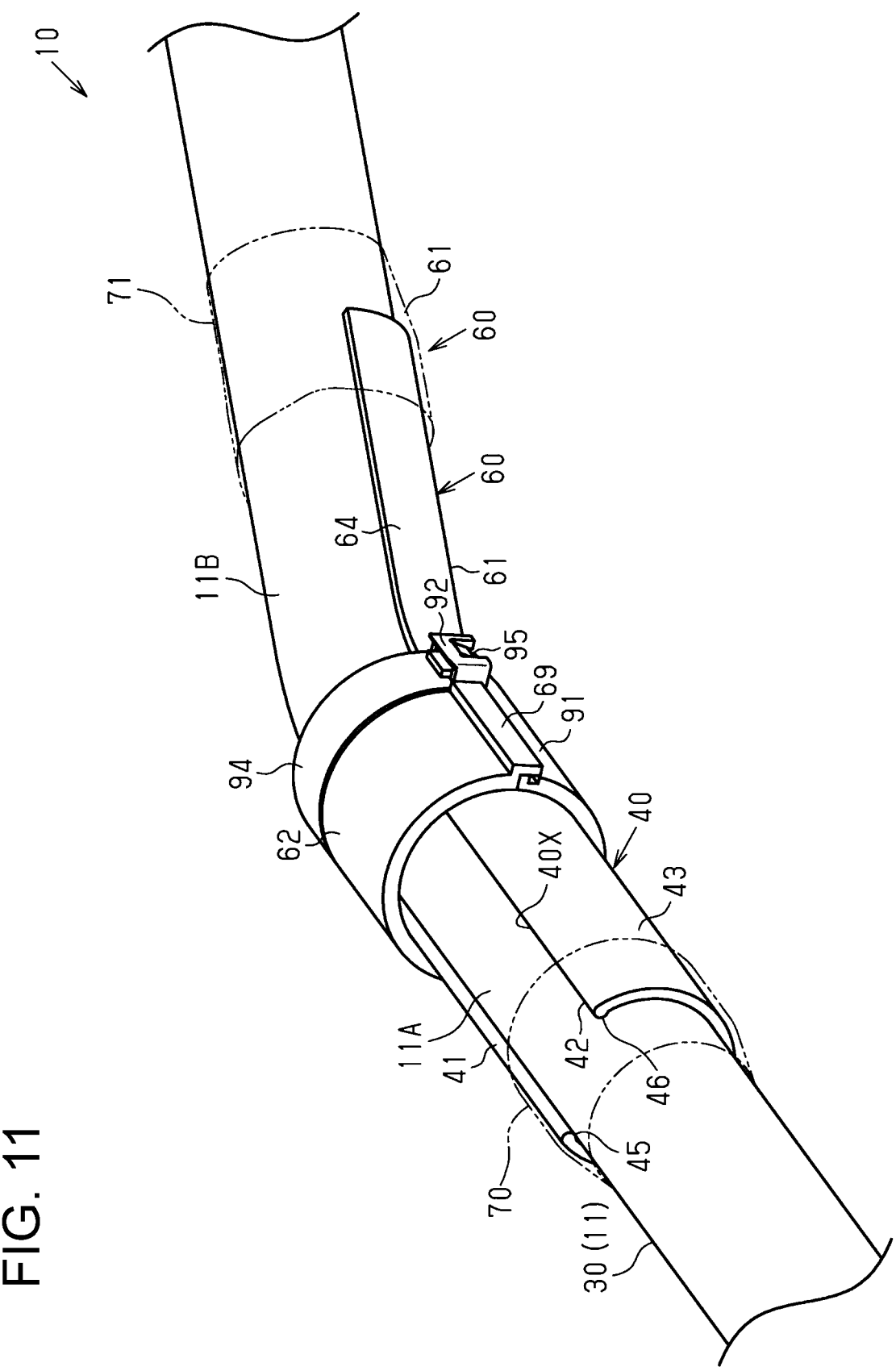
FIG. 11 is a schematic perspective view showing a wire harness according to a modified example.
Figure 12:
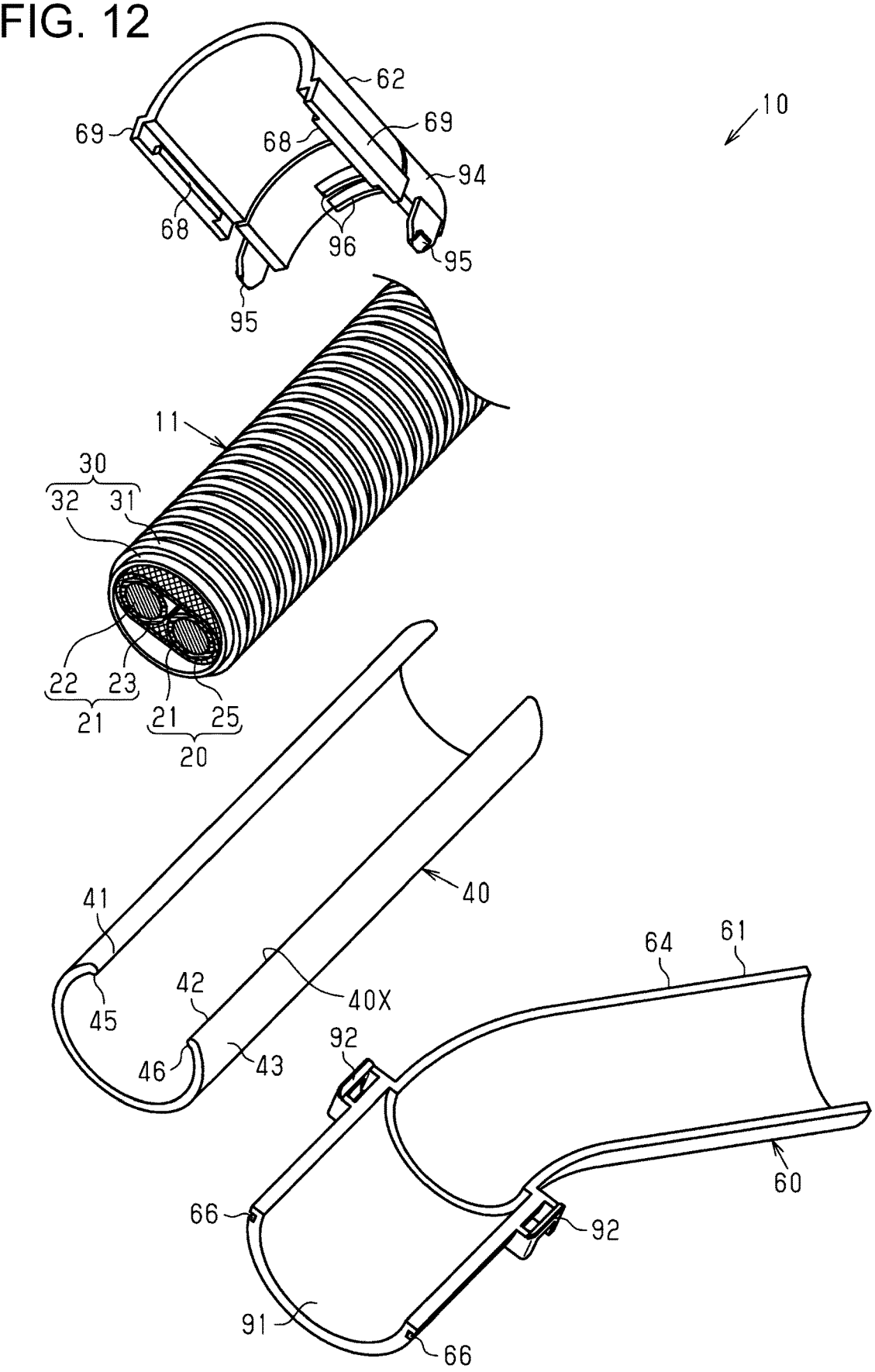
FIG. 12 is a schematic exploded perspective view showing a wire harness according to a modified example.

As shown in FIGS. 11 and 12, a receiving portion 91 in this example is provided with fitting-target portions 92 (fitting target). The fitting-target portions 92 are provided at end portions of the receiving portion 91 in the lengthwise direction thereof. The fitting-target portions 92 are provided at end portions of the second path restricting main body 61 on the main body portion 64 side in the receiving portion 91. The fitting-target portions 92 are provided at two end portions of the receiving portion 91 in the circumferential direction thereof.

Figure 13:
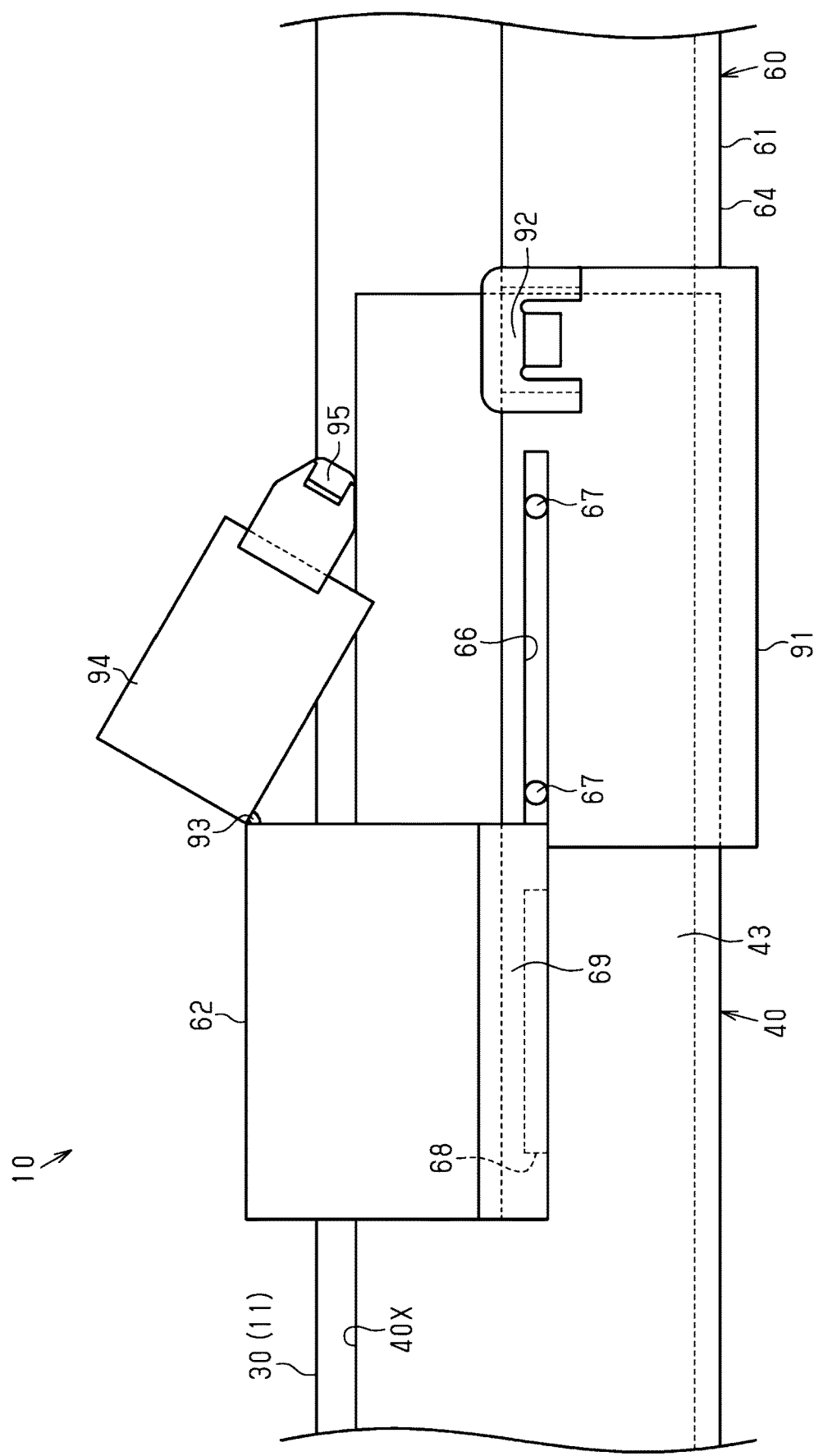
FIG. 13 is a schematic exploded side view showing a wire harness according to a modified example.
Figure 14:
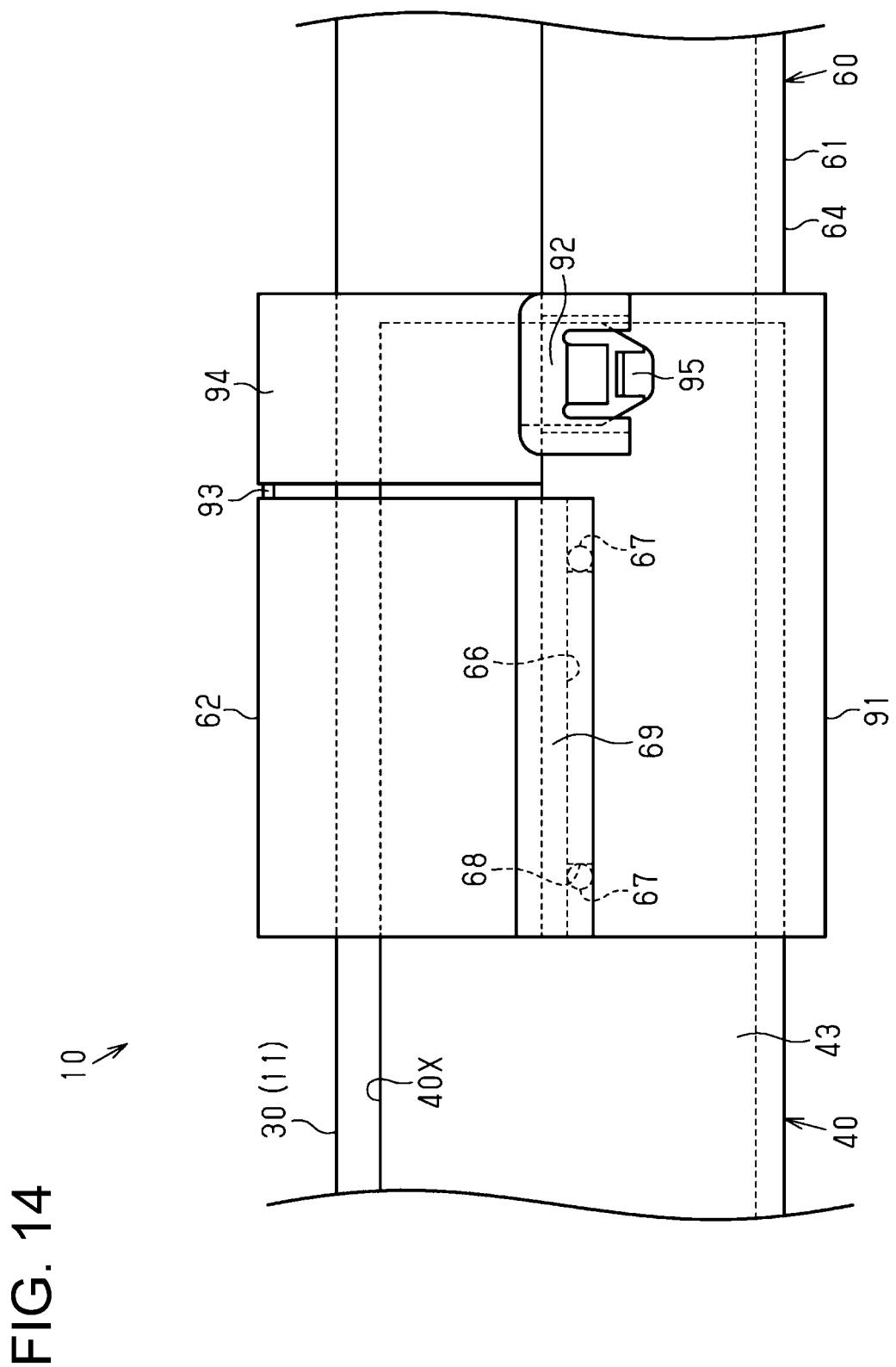
FIG. 14 is a schematic side view showing a wire harness according to a modified example.

As shown in FIGS. 13 and 14, the lid 62 in this example is provided with a lid rotation portion 94 (lid rotator) that can rotate about a thin hinge portion 93. The hinge portion 93 is provided at an end portion of the lid 62 in the lengthwise direction thereof. The hinge portion 93 is provided on a central portion of the lid 62 in the circumferential direction thereof. As with the lid 62, the lid rotation portion 94 has a semi-cylindrical horizontal cross-sectional shape as a whole. That is to say, the lid rotation portion 94 is formed so as to have a tubular horizontal cross-sectional shape in combination with the receiving portion 91.

The lid rotation portion 94 is provided with a lid claw portion 95 that serves as a lid fitting portion (lid fitting) that is fitted to the fitting-target portion 92 in a direction that intersects the lengthwise direction of the receiving portion 91, i.e., the direction in which the rail portions 66 extend, when the lid rotation portion 94 rotates. The lid claw portion 95 is configured to be able to engage with the fitting-target portion 92 so as not to become detached from the fitting-target portion 92 while being fitted into the fitting-target portion 92 in a direction that intersects the lengthwise direction of the receiving portion 91 when the lid rotation portion 94 rotates. Also, the lid claw portion 95 is configured to be able to be fitted into the fitting-target portion 92 in the lengthwise direction of the receiving portion 91 while being fitted into the fitting-target portion 92.

In this example, the receiving portion 91 and the lid 62 are prevented from moving away from each other in a radial direction as a result of the slidable portions 68 sliding while engaging with the rail portions 66. Furthermore, the slidable portions 68 are prevented from sliding as a result of the lid claw portion 95 being fitted into the fitting-target portion 92.

That is to say, in this example, the lid 62 is further prevented from becoming detached from the receiving portion 91. The lid claw portion 95 is configured to be fitted into the fitting-target portion 92 in a direction that intersects the direction in which the slidable portions 68 slide. Therefore, it is possible to strongly prevent the slidable portions 68 from sliding. Therefore, it is possible to strongly prevent the lid 62 from becoming detached from the receiving portion 91.

Also, as shown in FIG. 12, the lid rotation portion 94 in this example is provided with one or more protrusions 96, specifically two protrusions 96 in this example, which protrude from the inner surface of the lid rotation portion 94. The plurality of protrusions 96 are provided at intervals in the lengthwise direction of the second path restricting member 60. Each protrusion 96 is provided on a central portion of the lid rotation portion 94 in the circumferential direction thereof. Each protrusion 96 is formed so as to be fitted into one of the gaps between the large-diameter portions 31 of the exterior member 30 with the lid claw portion 95 being fitted into the fitting-target portion 92. Each protrusion 96 is, for example, formed so that the leading end of the protrusion 96 comes into contact with the outer circumferential surface of one of the small-diameter portions 32. With this configuration, the exterior member 30 is prevented from moving with respect to the second path restricting member 60 in the lengthwise direction of the exterior member 30. Therefore, it is possible to desirably prevent the second path restricting member 60 from being displaced with respect to the exterior member 30 in the lengthwise direction of the wire harness main body 11.

As shown in FIGS. 13 and 14, in this example, the rail portions 66 are provided with engaging protrusions 67. However, the present disclosure is not limited to such a configuration, and a configuration that is not provided with engaging protrusions 67 may be adopted.

Also, in this example, the fitting-target portions 92 are provided on end portions of the second path restricting main body 61 on the main body portion 64 side in the receiving portion 91. However, the fitting-target portions 92 may be provided on end portions on the opposite side to the main body portion 64, or on two end portions of the receiving portion 91 in the lengthwise direction thereof. In this case, it is preferable that the lid rotation portion 94 is provided according to the positions of the fitting-target portions 92.

Also, although the lid rotation portion 94 in this example is provided with two protrusions 96, the present disclosure is not limited to such a configuration. The number of protrusions 96 may be changed, or a configuration that is not provided with protrusions 96 may adopted.

Figure 15:
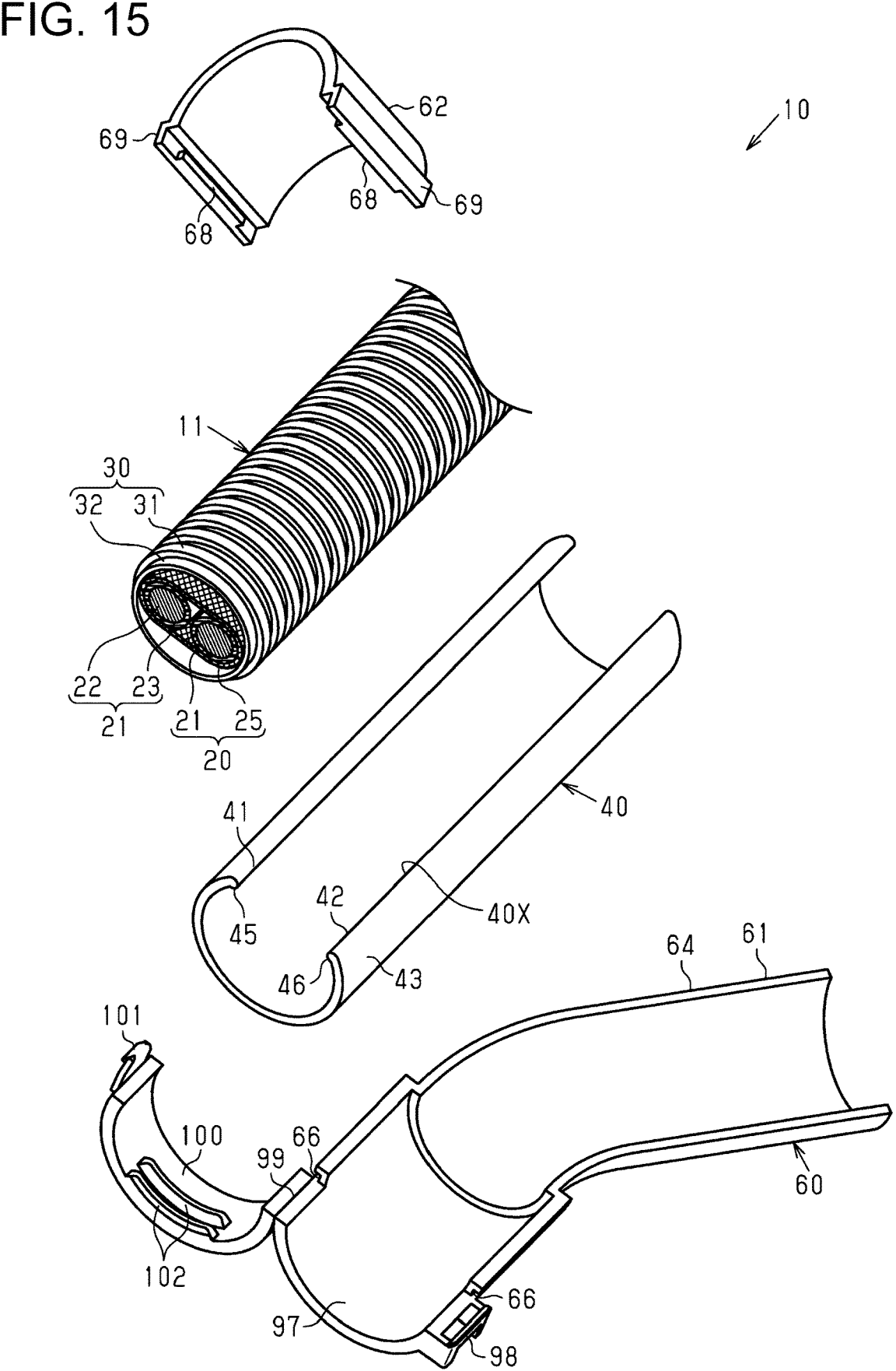
FIG. 15 is a schematic exploded perspective view showing a wire harness according to a modified example.
Figure 16:
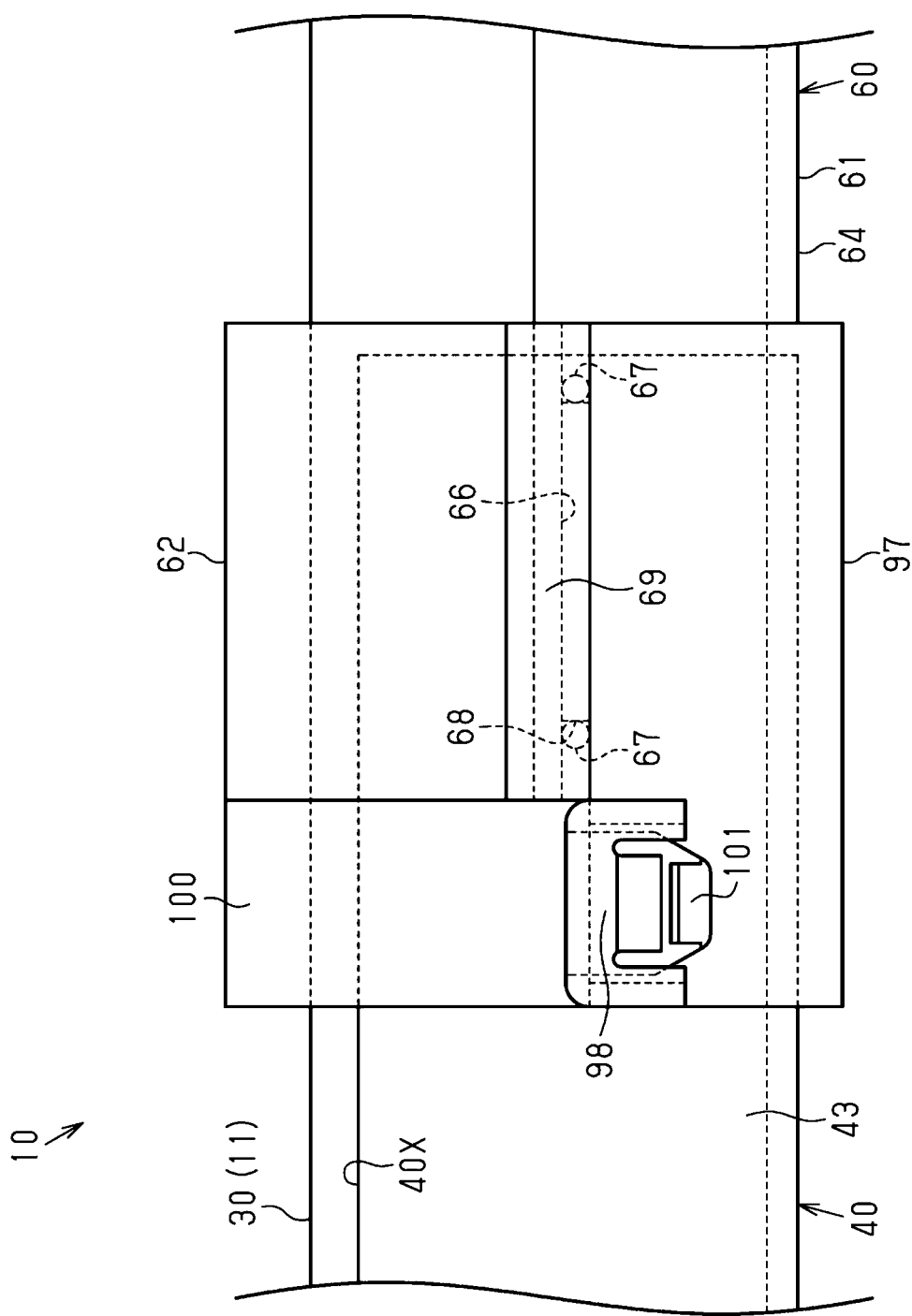
FIG. 16 is a schematic side view showing a wire harness according to a modified example.

Also, for example, the configuration may be changed as shown in FIGS. 15 and 16. In this example, the same reference numerals are given to the same configurations as in the above-described embodiment, and detailed description thereof will be omitted.

As shown in FIGS. 15 and 16, a receiving portion 97 in this example is provided with a fitting-target portion 98. The fitting-target portion 98 is provided at an end portion of the receiving portion 97 in the lengthwise direction thereof. The fitting-target portion 98 is provided at an end portion of the second path restricting main body 61 on the opposite side to the main body portion 64 in the receiving portion 97. The fitting-target portion 98 is provided at one end portion of the receiving portion 97 in the circumferential direction thereof. Note that the portion of the receiving portion 97 on which the fitting-target portion 98 is provided is shorter than the portions of the receiving portion 97 on which the rail portions 66 are provided, in the circumferential direction thereof.

As shown in FIG. 15, the receiving portion 97 in this example is provided with a rotation portion 100 (rotator) that can rotate about a thin hinge portion 99. The hinge portion 99 is provided at an end portion of the second path restricting main body 61 on the opposite side to the main body portion 64 in the receiving portion 97. The hinge portion 99 is provided on the other end portion of the receiving portion 97 in the circumferential direction thereof. The rotation portion 100 is formed so as to have a tubular horizontal cross-sectional shape in combination with the receiving portion 97.

The rotation portion 100 is provided with a claw portion 101 that serves as a fitting portion (fitting) that is fitted to the fitting-target portion 98 in a direction that intersects the lengthwise direction of the receiving portion 97, i.e., the direction in which the rail portions 66 extend when the rotation portion 100 rotates. The claw portion 101 is configured to be able to engage with the fitting-target portion 98 in a direction that intersects the lengthwise direction of the receiving portion 97, and engage with the fitting-target portion 98 so as not to become detached from the fitting-target portion 98 when the rotation portion 100 rotates. Also, the claw portion 101 is configured to be able to engage with the fitting-target portion 98 in the lengthwise direction of the receiving portion 97 while being fitted into the fitting-target portion 98. The rotation portion 100 is located so as to engage with the lid 62 with the claw portion 101 being fitted to the fitting-target portion 98, and prevents the slidable portions 68 from sliding, together with the lid 62.

In this example, the receiving portion 97 and the lid 62 are prevented from moving away from each other in a radial direction as a result of the slidable portions 68 sliding while engaging with the rail portions 66. Furthermore, the slidable portions 68 are prevented from sliding as a result of the claw portion 101 being fitted into the fitting-target portion 98.

That is to say, in this example, the lid 62 is further prevented from becoming detached from the receiving portion 97. The claw portion 101 is configured to be fitted into the fitting-target portion 98 in a direction that intersects the direction in which the slidable portions 68 slide. Therefore, it is possible to strongly prevent the slidable portions 68 from sliding. Therefore, it is possible to strongly prevent the lid 62 from becoming detached from the receiving portion 97.

Also, as shown in FIG. 15, the rotation portion 100 in this example is provided with one or more protrusions 102, specifically two protrusions 102 in this example, which protrude from the inner surface of the rotation portion 100. The plurality of protrusions 102 are provided at intervals in the lengthwise direction of the second path restricting member 60. Each protrusion 102 is provided on a central portion of the rotation portion 100 in the circumferential direction thereof. Each protrusion 102 is formed so as to be fitted into one of the gaps between the large-diameter portions 31 of the exterior member 30 with the claw portion 101 being fitted into the fitting-target portion 98. Each protrusion 102 is, for example, formed so that the leading end of the protrusion 102 comes into contact with the outer circumferential surface of one of the small-diameter portions 32. With this configuration, the exterior member 30 is prevented from moving with respect to the second path restricting member 60 in the lengthwise direction of the exterior member 30. Therefore, it is possible to desirably prevent the second path restricting member 60 from being displaced with respect to the exterior member 30 in the lengthwise direction of the wire harness main body 11.

Note that, as shown in FIG. 16, in this example, the rail portions 66 are provided with engaging protrusions 67. However, the present disclosure is not limited to such a configuration, and a configuration that is not provided with engaging protrusions 67 may be adopted. Also, the rail portions 66 may have a configuration in which the end portion of the second path restricting main body 61 on the main body portion 64 side is not open in the receiving portion 97.

Also, although the rotation portion 100 in this example is provided with two protrusions 102, the present disclosure is not limited to such a configuration. The number of protrusions 102 may be changed, or a configuration that is not provided with protrusions 102 may adopted.

In the above-described embodiment, each rail portion 66 is provided with two engaging protrusions 67. However, the present disclosure is not limited to such a configuration. For example, each rail portion 66 may have only one engaging protrusion 67 or no engaging protrusion 67.

In the above-described embodiment, each rail portion 66 is provided so as to extend over the entirety of the receiving portion 65 in the lengthwise direction thereof. However, the present disclosure is not limited to such a configuration, and each rail portion 66 may be provided so as not to reach either one of the end portions in the lengthwise direction of the receiving portion 65. In other words, the rail portions 66 may be configured such that only one end thereof in the lengthwise direction of the receiving portion 65 is open, and the other end in the lengthwise direction of the receiving portion 65 is not open.

The second path restricting member 60 in the above-described embodiment is formed so as to restrict the path of the bent section 11B of the wire harness main body 11. However, the present disclosure is not limited to such a configuration. For example, the shape of the second path restricting member 60 may be changed so as to restrict the path of the straight section 11A of the wire harness main body 11. In the second path restricting member 60 in this case, for example, the bent shape in the main body portion 64 is changed to a straight shape.

In the above-described embodiment, an attaching member attached to the first path restricting member 40 is embodied as the second path restricting member 60. However, the present disclosure is not limited to such a configuration. For example, the attaching member may be embodied as a vehicle attaching member that is used to attach the first path restricting member 40 to the vehicle V.

The configuration of the first path restricting member 40 in the above-described embodiment may be changed as appropriate. For example, as long as the first path restricting member 40 has the insertion port 40X and is configured to be attachable to the outer circumferential surface of the exterior member 30, other configurations are not specifically limited.

The protruding portion 45 in the above-described embodiment may be provided further away from the insertion port 40X than the leading end of the first end portion 41 in the circumferential direction of the first path restricting member 40.

The protruding portion 46 in the above-described embodiment may be provided further away from the insertion port 40X than the leading end of the second end portion 42 in the circumferential direction of the first path restricting member 40.

The protruding portions 45 and 46 in the above-described embodiment may be provided on a portion of the first path restricting member 40 in the lengthwise direction thereof.

At least either one of the protruding portions 45 and 46 in the above-described embodiment may be omitted.

The first path restricting member 40 in the above-described embodiment may be configured so that the thickness of the coupling portion 43 in a radial direction thereof varies in the circumferential direction.

The shape of the coupling portion 43 of the first path restricting member 40 in the above-described embodiment is not limited to an arc shape, and may be changed to an ellipsoidal arc shape, a U shape, or the like, for example.

In the above-described embodiment, the first path restricting member 40 and the second path restricting member 60 are more rigid than the exterior member 30. However, the present disclosure is not limited to such a configuration, and the first path restricting member 40 and the second path restricting member 60 may be as rigid as the exterior member 30, or less rigid than the exterior member 30. That is to say, it is only necessary that the first path restricting member 40 and the second path restricting member 60 make the wire harness main body 11 less bendable than when the first path restricting member 40 and the second path restricting member 60 are not attached to the wire harness main body 11.

For example, the exterior member 30 in the above-described embodiment may be a resin corrugated tube with a metal layer that contains a metal material, formed on the outer surface thereof.

The exterior member 30 in the above-described embodiment is not limited to being a corrugated tube, and may be an exterior member that is not provided with a large-diameter portions 31 or a small-diameter portions 32, for example.

The exterior member 30 in the above-described embodiment may have a slit that extends in the lengthwise direction of the exterior member 30.

Although the electric wires 21 in the above-described embodiment are high-voltage electric wires, the present disclosure is not limited to such a configuration. For example, the electric wires 21 may be low-voltage electric wires.

In the electric wire member 20 in the above-described embodiment, an electromagnetic shield member is embodied as the braided member 25. However, the present disclosure is not limited to such a configuration. For example, the electromagnetic shield member in the electric wire member 20 may be embodied as a metal foil.

The braided member 25 of the electric wire member 20 in the above-described embodiment may be omitted.

In the above-described embodiment, the number of electric wires 21 included in the electric wire member 20 is two. However, the present disclosure is not limited to such a configuration. The number of electric wires 21 may be one or three or more.

The positional relationship between the inverter M1 and the high-voltage battery M2 in the vehicle V is not limited to that in the above-described embodiment, and may be changed as appropriate depending on the vehicle configuration.

In the above-described embodiment, a plurality of on-board devices to which the wire harness 10 is to be electrically connected are embodied as the inverter M1 and the high-voltage battery M2. However, the present disclosure is not limited to such a configuration. The plurality of on-board devices to which the wire harness 10 is to be electrically connected are not particularly limited as long as they are electric devices to be mounted in the vehicle V.

The embodiments disclosed herein are illustrative in all aspects and should not be considered restrictive. The scope of the present disclosure is indicated by the scope of claims, not the above-mentioned meaning, and is intended to include all modifications within the meaning and scope equivalent to the scope of claims.

What is claimed is:

1. A wire harness comprising:
a wire harness main body that includes an electric wire and an exterior tube that covers an outer circumferential surface of the electric wire;
a first path restrictor that is attached to an outer circumferential surface of the exterior tube and is configured to restrict a path of the wire harness main body; and
an attachment that is attached to an outer circumferential surface of a portion of the first path restrictor in a lengthwise direction thereof, wherein:
the first path restrictor has a C-like cross-sectional shape and covers a range larger than half of the outer circumferential surface of the exterior tube in a circumferential direction of the exterior tube, and is provided with an insertion port that is open in a direction orthogonal to the lengthwise direction of the first path restrictor, the insertion port extending over an entirety of the first path restrictor in the lengthwise direction thereof,
the attachment is provided with a receiver that covers a portion of the first path restrictor in a circumferential direction thereof, and a lid that covers all the way around the first path restrictor together with the receiver,
the receiver is provided with a rail that extends in a lengthwise direction of the receiver,
the lid is provided with a slide that is configured to be slidable along the rail while engaging with the rail so that the lid does not become detached from the receiver,
the receiver and the lid sandwich the first path restrictor with the slide engaging with the rail,
the receiver is provided with a fitting target and a rotator configured to be rotatable about a thin hinge, and
the rotator is provided with a fitting configured to be fitted into the fitting target in a direction that intersects the lengthwise direction of the receiver when the rotator rotates, and the rotator prevents the slide from sliding, with the fitting being fitted into the fitting target.

2. The wire harness according to claim 1, wherein the rail is provided with an engaging protrusion that engages with the slide in a direction in which the lid attached to the receiver becomes detached therefrom, while allowing the slide engaging with the rail to slide.

3. The wire harness according to claim 1, wherein the rail is provided so as to extend over an entirety of the receiver in the lengthwise direction thereof.

4. The wire harness according to claim 1, wherein:
when viewed in a radial direction of the receiver, the rail is provided with:
a rail main body groove that is inclined with respect to the lengthwise direction of the receiver so as to gradually extend away from an end of the receiver in a circumferential direction thereof,
a branch groove that branches from a base end side of the rail main body groove and extends in a direction away from an end of the receiver in the circumferential direction thereof, and
a lock-target groove that is bent from a leading end side of the branch groove and extends in parallel to the lengthwise direction of the receiver,
the slide is provided with:
a slidable main body that is provided on one end side in a lengthwise direction of the lid and that is configured to be movable while being fitted into the rail main body groove, and
a lock that is provided on the other end side in the lengthwise direction of the lid and that is configured to be movable while being fitted into the branch groove and the lock-target groove, and
the lid is attached to the receiver with the slidable main body being positioned on a leading end side of the rail main body groove and the lock being positioned in the lock-target groove.

5. The wire harness according to claim 1, wherein:
the attachment is a second path restrictor that is attached to the outer circumferential surface of the exterior tube and is configured to restrict the path of the wire harness main body, and
the receiver is provided at an end of the second path restrictor in a lengthwise direction thereof, and covers a portion of a circumferential surface of an end of the first path restrictor in the lengthwise direction thereof.

6. The wire harness according to claim 5, wherein:
the first path restrictor is configured to restrict a path of a straight section that is included in the path of the wire harness main body, and
the second path restrictor is configured to restrict a path of a bend that is included in the path of the wire harness main body.

7. A wire harness comprising:
a wire harness main body that includes an electric wire and an exterior tube that covers an outer circumferential surface of the electric wire;
a first path restrictor that is attached to an outer circumferential surface of the exterior tube and is configured to restrict a path of the wire harness main body; and
an attachment that is attached to an outer circumferential surface of a portion of the first path restrictor in a lengthwise direction thereof, wherein:
the first path restrictor is provided with an insertion port that is open in a direction orthogonal to the lengthwise direction of the first path restrictor, and extends over an entirety of the first path restrictor in the lengthwise direction thereof,
the attachment is provided with a receiver that covers a portion of the first path restrictor in a circumferential direction thereof, and a lid that covers all the way around the first path restrictor together with the receiver,
the receiver is provided with a rail that extends in a lengthwise direction of the receiver,
the lid is provided with a slide that is configured to be slidable along the rail while engaging with the rail so that the lid does not become detached from the receiver,
the receiver and the lid sandwich the first path restrictor with the slide engaging with the rail, and
the rail is provided with an engaging protrusion that engages with the slide in a direction in which the lid attached to the receiver becomes detached therefrom, while allowing the slide engaging with the rail to slide.

8. A wire harness comprising:
a wire harness main body that includes an electric wire and an exterior tube that covers an outer circumferential surface of the electric wire;
a first path restrictor that is attached to an outer circumferential surface of the exterior tube and is configured to restrict a path of the wire harness main body; and
an attachment that is attached to an outer circumferential surface of a portion of the first path restrictor in a lengthwise direction thereof, wherein:
the first path restrictor is provided with an insertion port that is open in a direction orthogonal to the lengthwise direction of the first path restrictor, and extends over an entirety of the first path restrictor in the lengthwise direction thereof,
the attachment is provided with a receiver that covers a portion of the first path restrictor in a circumferential direction thereof, and a lid that covers all the way around the first path restrictor together with the receiver,
the receiver is provided with a rail that extends in a lengthwise direction of the receiver,
the lid is provided with a slide that is configured to be slidable along the rail while engaging with the rail so that the lid does not become detached from the receiver,
the receiver and the lid sandwich the first path restrictor with the slide engaging with the rail,
the receiver is provided with a fitting target,
the lid is provided with a lid rotator that is configured to be rotatable about a thin hinge, and
the lid rotator is provided with a lid fitting configured to be fitted into the fitting target in a direction that intersects the lengthwise direction of the receiver when the lid rotator rotates.

\* \* \* \* \*